United States Patent
Bai et al.

(10) Patent No.: US 9,903,733 B2
(45) Date of Patent: Feb. 27, 2018

(54) VEHICULAR COMMUNICATIONS NETWORK AND METHODS OF USE AND MANUFACTURE THEREOF

(71) Applicant: Honda Motor Co., Ltd., Tokyo (JP)

(72) Inventors: Xue Bai, Novi, MI (US); Radovan Miucic, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 15/073,598

(22) Filed: Mar. 17, 2016

(65) Prior Publication Data

US 2017/0268896 A1 Sep. 21, 2017

(51) Int. Cl.
 *G01C 21/36* (2006.01)
(52) U.S. Cl.
 CPC .................... *G01C 21/36* (2013.01)
(58) Field of Classification Search
 CPC ..................................... G01C 21/36
 See application file for complete search history.

(56) References Cited

U.S. PATENT DOCUMENTS

| 2008/0183355 A1* | 7/2008 | Taylor | B60C 23/0408 701/49 |
| 2012/0303222 A1* | 11/2012 | Cooprider | B60W 10/06 701/48 |
| 2013/0030606 A1* | 1/2013 | Mudalige | G08G 1/22 701/2 |

* cited by examiner

Primary Examiner — Rodney A Butler
(74) Attorney, Agent, or Firm — Rankin, Hill & Clark LLP

(57) ABSTRACT

A vehicular communications network for use with at least one source of historical path data relevant to historical conditions of a vehicular path, at least one source of current path data relevant to current conditions of the path, and vehicle location data relevant to a vehicle's location on the path. The vehicular communications network can include a processor that is configured to: access the historical path data, the current path data, and the vehicle location data, determine the vehicle's current location based on the vehicle location data, determine a path pattern relevant to the determined vehicle current location based on the historical path data, and predict an anticipated path condition based on the determined path pattern and the current path data. A driver vehicle interface can be configured to communicate the anticipated path condition to the vehicle operator.

20 Claims, 13 Drawing Sheets

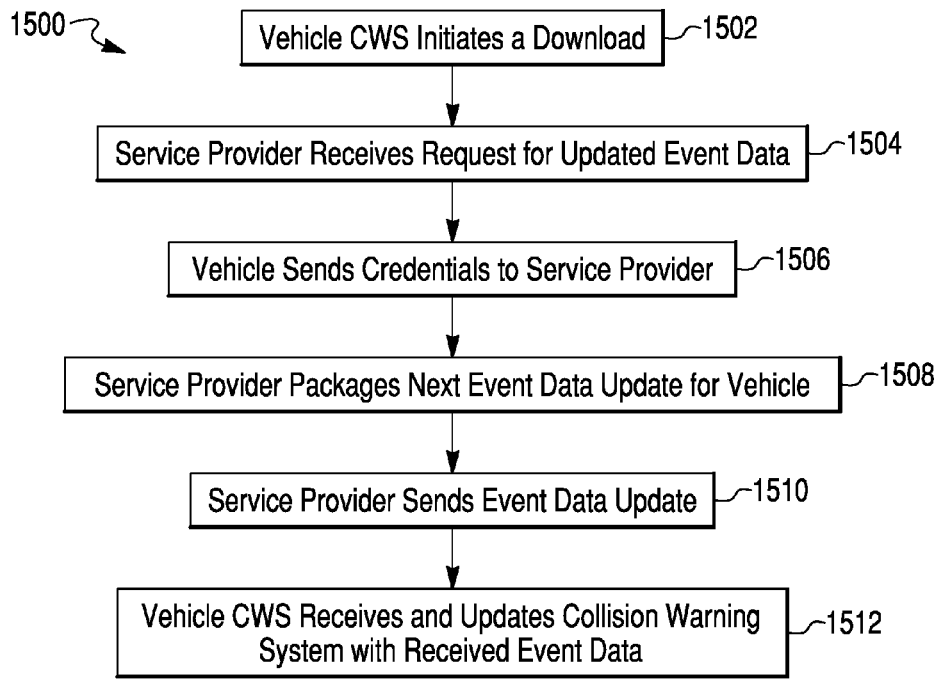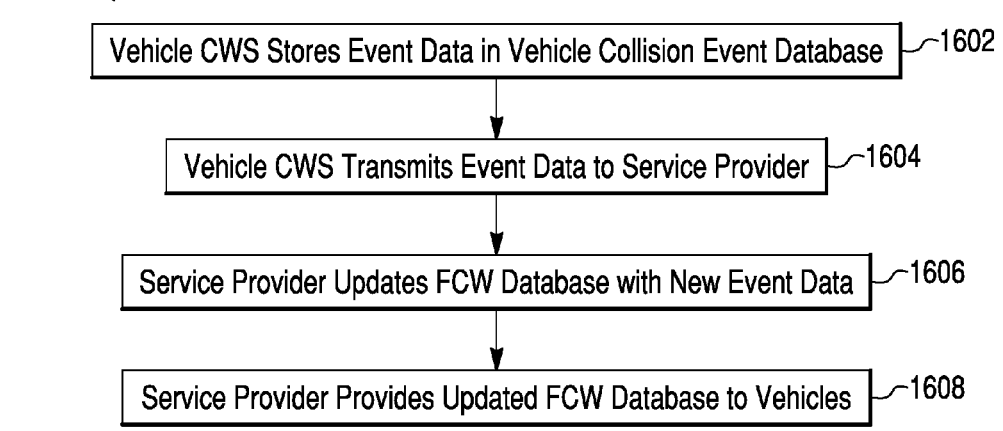

VEHICULAR COMMUNICATIONS NETWORK AND METHODS OF USE AND MANUFACTURE THEREOF

BACKGROUND

The disclosed subject matter relates to vehicular communications networks and methods of use and manufacture thereof. In particular, some embodiments relate to methods and apparatus for generating, transmitting, and/or receiving data along a vehicular communications network relating to a vehicle's location and/or path or route of travel.

Various conditions may be relevant to a vehicle's travel along a path or route. For example, in the context of vehicles that travel over land, such as an automobile configured for travel along a road, a vast array of circumstances may arise that can affect or otherwise be relevant to the vehicle's travel. An entity, such as another vehicle, pedestrian, bicyclist, etc., may move to a location immediately in front of the vehicle on the road, causing the vehicle to contact the entity unless the vehicle stops, changes course, etc. As another example, other types of circumstances may arise making it preferable to change the vehicle's path or route of travel, such as to enable the vehicle to arrive at a certain destination more safely, quickly, efficiently, etc. Changing traffic patterns may make a vehicle's current path of travel more congested, and thus a different path may be preferable.

Vehicles may be provided with methods and apparatus for addressing the above conditions. For example, sensors can be mounted on vehicles to detect entities currently disposed in the vehicle's immediate path of travel for the purpose of warning the vehicle's operator to take action to avoid crashing into the entity. Vehicular operators may also utilize global positioning systems (GPSs) to determine currently effective routes of travel, and even modify these routes based on changing traffic conditions. In other words, current conditions can be monitored for the purpose of benefiting vehicular operators.

SUMMARY

The monitoring and use of data other than currently sensed or real time data may further benefit vehicular operators. For example, historical data may be used to provide further guidance, such as to advise vehicular operators to change travel routes. As one example, a certain route may be very congested at certain times and/or days of the week (such as during a weekday rush hour), making it more effective to take another (albeit longer) route that is less congested at the relevant time, day, etc. Historical data relating to the physical conditions of certain roads, bridges, etc. at certain times, days of the week, etc. may also affect route selection. Historical data may be used to select enhanced routes of travel based on safety issues that may arise at certain times of day, days of the week, times of the year, etc., such as to avoid certain roads during times of the year where treacherous conditions may exist, e.g., ice, snow, flooding, etc.

Historical data by itself may be used to determine that a trend or pattern at a certain time, day of the week, time of the year, etc., at a certain location along a vehicle's path or route is likely to occur. As one example, pedestrians, bicyclists, etc., may tend to illegally cross a street at certain times of day (such as when a local school releases its students), or automobiles may tend to illegally fail to stop for a red light of an intersection at certain times of day (such as near the time when workers need to arrive at a local office). This trend or pattern may be used to alert a vehicle operator of these potentially dangerous conditions if the vehicle will be traveling proximate these locations at the relevant times, etc. However, the trend or pattern that is determined based solely on the historical data may frequently be inaccurate, and thus may result in unnecessarily alerting the vehicle operator and thus needlessly annoying or distracting the vehicle operator.

In addition, the effectiveness of historical data alone may be limited to predictable events, such as the regular closure of roads, bridges, etc., or regular traffic patterns. However, some traffic patterns or road hazards do not follow regular or predictable schedules, and may change periodically. It may therefore be beneficial to combine historical data with other data, or otherwise use historical data more dynamically, such as to address less predictable events. For example, trends or patterns can be determined based on historical data collected from one or multiple sources, and the relevance of these trends or patterns can be predicted based on other types of data, such as data relating to current conditions.

It may therefore be even more beneficial to supplement the trends or patterns that are determined based on historical data with more relevant or current data. In other words, it may be beneficial to warn a vehicle operator where both of the following occur: 1) historical data indicates that a certain trend exists that may be relevant to the vehicle's travel along the path or route; and 2) currently sensed or other data indicates an increased likelihood that the trend will occur. For example, using data indicating the existence of an entity relevant to the trend, such as an actual bicycle or pedestrian approaching a road where bicyclists or pedestrians trend to cross illegally, or the approach of an actual automobile to an intersection where automobiles tend to fail to stop at red lights, may provide vehicular operators with even better or more effective information.

Some embodiments are therefore directed to ascertaining a potential road hazard or collision with another entity, such as a vehicle, pedestrian, or wildlife, and sharing the information within a vehicle communication network. Some embodiments are directed to data logging of unexpected or incompliant actual or potential road hazards and scenarios into a database for integration with a vehicle collision warning system. Embodiments include making a determination of a potential road hazard that could become a collision event, data logging potential road hazards, vehicle data, traffic and vehicle data from other vehicles and users, and environmental data external to a vehicle, predicting a road hazard based on patterns of collected data, and methods of sharing alert information with other vehicles and users in a vehicle communication network.

More particularly, some embodiments are directed to a vehicular communications network for use with a vehicle that is configured for operation by a vehicle operator and for travel along a path, at least one source of historical path data relevant to historical conditions of the path, at least one source of current path data relevant to current conditions of the path, and vehicle location data relevant to the vehicle's location on the path. The vehicular communications network can include a processor that is configured to: access the historical path data, the current path data, and the vehicle location data, determine the vehicle's current location based on the vehicle location data, determine a path pattern relevant to the determined vehicle current location based on the historical path data, and predict an anticipated path condition based on the determined path pattern and the current path data. A communicator can be configured to communicate the anticipated path condition to the vehicle operator.

Some other embodiments are directed to a vehicular communications network for use with a vehicle that is configured for operation by a vehicle operator and for travel along a path, at least one source of historical path data relevant to historical conditions of the path, and vehicle location data relevant to the vehicle's location on the path. The vehicular communications network can include at least one sensor that is configured to sense current path data relevant to current conditions of the path, and an electronic storage medium that is configured to store at least one of the historical path data, the current path data, and the vehicle location data. A processor can be configured to: communicate with the electronic storage medium to access at least one of the historical path data, the current path data, and the vehicle location data, determine the vehicle's current location based on the vehicle location data, determine a path pattern relevant to the determined vehicle current location based on the historical path data, and predict an anticipated path condition based on the determined path pattern and the current path data. A communicator can be configured to communicate the anticipated path condition to the vehicle operator.

Still other embodiments are directed to a method of assessing vehicular conditions and communicating the assessed conditions to an operator of a vehicle that is configured for travel along a path. The method can be implemented by a processor and include: assessing historical path data relevant to historical conditions of the path, current path data relevant to current conditions of the path, and vehicle location data relevant to the vehicle's location on the path; determining the vehicle's current location based on the vehicle location data; determining a path pattern relevant to the determined vehicle current location based on the historical path data; predicting an anticipated path condition based on the determined path pattern and the current path data; and communicating the anticipated path condition to the vehicle operator.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 15 is a flowchart of a method to update event data at the collision warning system of FIG. 4 by the service provider of FIG. 3.

FIG. 16 is a flowchart of an exemplary method for transmitting event data to the service provider of FIG. 3.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle Communication Network

Some of the disclosed embodiments relate to a vehicle communication network that is disclosed below in the context of a traffic scenario 100. This scenario may involve one or more users and vulnerable road users (VRUs). The users can include vehicles, and the VRUs can include pedestrians, automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, bicycles, ATVs, roadside units, transportable objects, trains, trams, light rail trains, boats, personal watercraft, aircraft, helicopters, or any transport related entity or infrastructure. In fact, the various disclosed methods and apparatus are intended to be usable with any type of user and/or mode of transport that can travel along, or can be located in proximity to, any improved, unimproved, and/or unmarked path.

The disclosed vehicle communication network is intended to be implemented with any known, related art or later developed technologies. For example, the implemented technologies can involve ad hoc networks, Dedicated Short Range Communications (DSRC) networks (including but not limited to those types of networks currently used by some transport and traffic systems, such as for automatic toll collection), wireless access in vehicular environments (WAVE), cellular networks, Wi-Fi networks, and/or any other network protocol that can provide the desired functionalities.

Some of the embodiments are disclosed below in the context of a DSRC, which is a short to medium range communications service that provides communications links with high data transfer rates with acceptable or minimal latency. Vehicles, users, and infrastructure equipped with DSRC systems may communicate with each other, with remote DSRC compatible transceivers over a network, or with road side equipment (such as transport related infrastructure). The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Some DSRC systems communicate with vehicles operating at 100 miles per hour or less, but embodiments are intended to cover communications with vehicles traveling at any speed.

Figure 1:
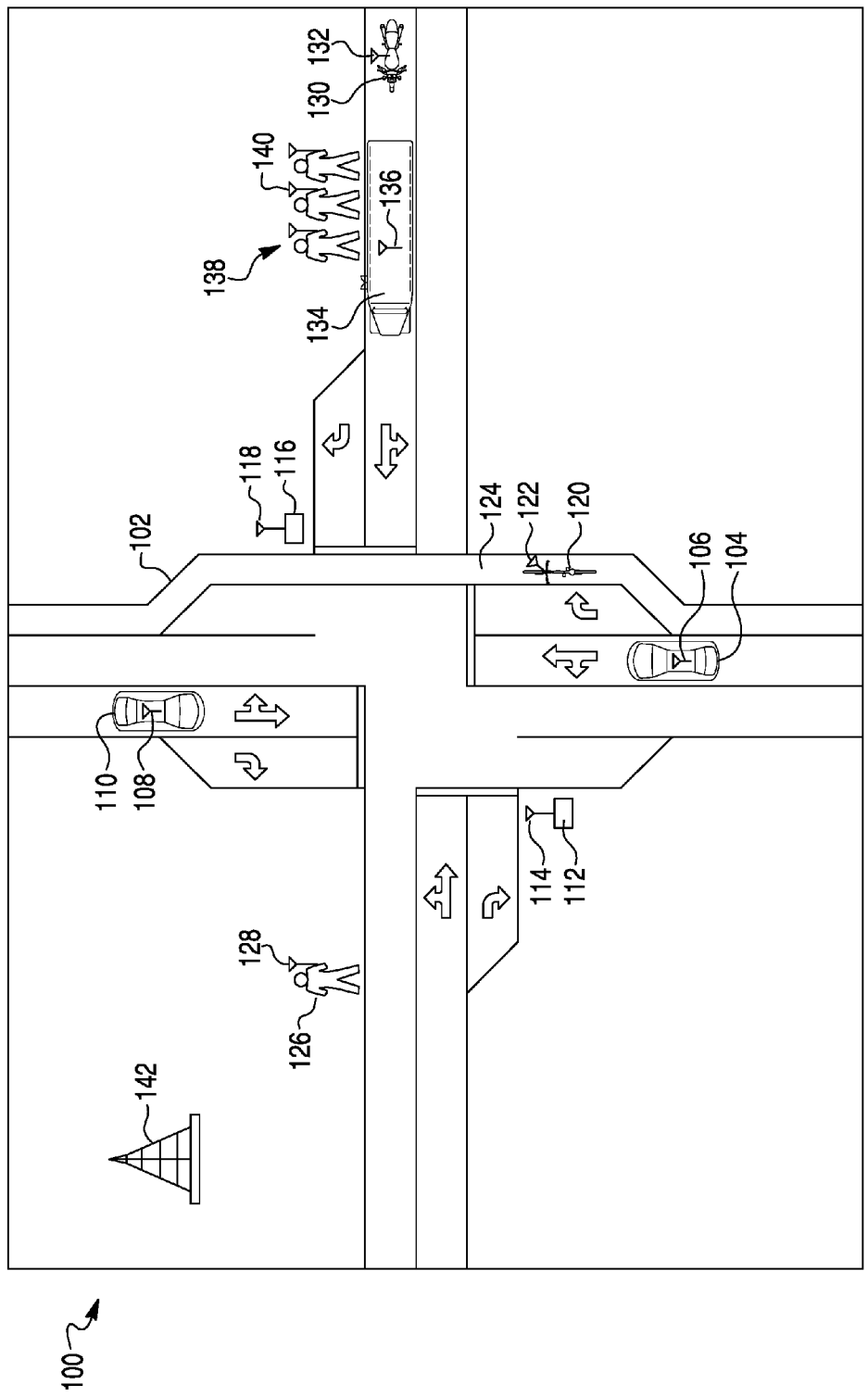
FIG. 1 is a schematic of a traffic scenario that involves an intersection.

FIG. 1 is a schematic of a traffic scenario 100 that involves an intersection 102. Various users, VRUs, and vehicle communication network components can be disposed at or proximate the disclosed intersection 102, including a vehicle 104, a remote vehicle 110, road side equipment (RSE) 112 and 116, a bicycle 120, a single pedestrian 126, a school bus 134, a group of pedestrians 138, and a motorcycle 130. However, the above users, VRUs, and components are merely provided for exemplary purposes to facilitate explanation of the disclosed vehicle communication network, and alternative or additional features may be provided. For example, FIG. 1 also shows a bicycle lane 124 along which the bicycle 120 travels. In addition, FIG. 1 shows a cellular network antenna 142 for use with the vehicle communication network.

The vehicle 104 can transmit, receive and/or exchange communications including data, images, messages, and other information with other vehicles and VRUs using the DSRC network, which can be implemented with DSRC compatible transceivers, such as V2X compatible transceivers. "V2X" is used in the present disclosure to cover "vehicle-to-everything" communications, and variations of V2X designations may depend on the intended user that is transmitting V2X signals.

As shown in FIG. 1, vehicle 104 may be equipped with a vehicle to vehicle (V2V) transceiver 106 that can exchange messages and information with other users equipped with DSRC compatible transceivers. For example, the V2V transceiver 106 can communicate with remote vehicle 110 via a V2V (vehicle to vehicle) transceiver 108, bicycle 120 via a V2B (vehicle to bicycle) transceiver 122, pedestrian 126 via a V2P (vehicle to pedestrian) transceiver 128, motorcycle 130 via a V2M (vehicle to motorcycle) transceiver 132, school bus 134 via a V2V transceiver 136, and pedestrians 138 via V2P transceivers 140. RSEs 112 and 116 are each equipped with V2I transceivers 114 and 118, respectively, which can be used to transmit information from any type of traffic infrastructure, such as traffic signals, or traffic sensors for speed or road conditions, etc.

The V2V transceiver 106 may include components for communicating various types of information between vehicle 104 and other network connected vehicles, VRUs, infrastructure, and networks. In some embodiments, V2V transceiver 106 is intended to be used with one or more vehicle safety systems. Examples of vehicle safety systems include, but are not limited to, collision warning systems, lane departure warning systems, integrated vehicle-based safety systems, automatic guided vehicle systems, other types of safety systems, etc.

In some embodiments, vehicle 104 may exchange information between one or more remote vehicles 110. For example, vehicle 104 V2V transceiver 106 and remote vehicle 110 V2V transceiver 108 may be configured to exchange vehicle information that can include, but is not limited to, the type of user or vehicle, navigation data, road hazard data, collision warning data, course heading data, course history data, projected course data, kinematic data, current position data, range or distance data, speed and acceleration data, location data, vehicle sensory data, vehicle subsystem data, and/or any other vehicle information. In various embodiments, vehicle 104 may exchange information using V2X protocols with any number of vehicles, pedestrians, or any other V2X users with an operational V2X transceiver. For example, vehicle 104, remote vehicle 110, motorcycle 130, and school bus 134 may be configured to exchange information over V2X protocols.

Figure 2:
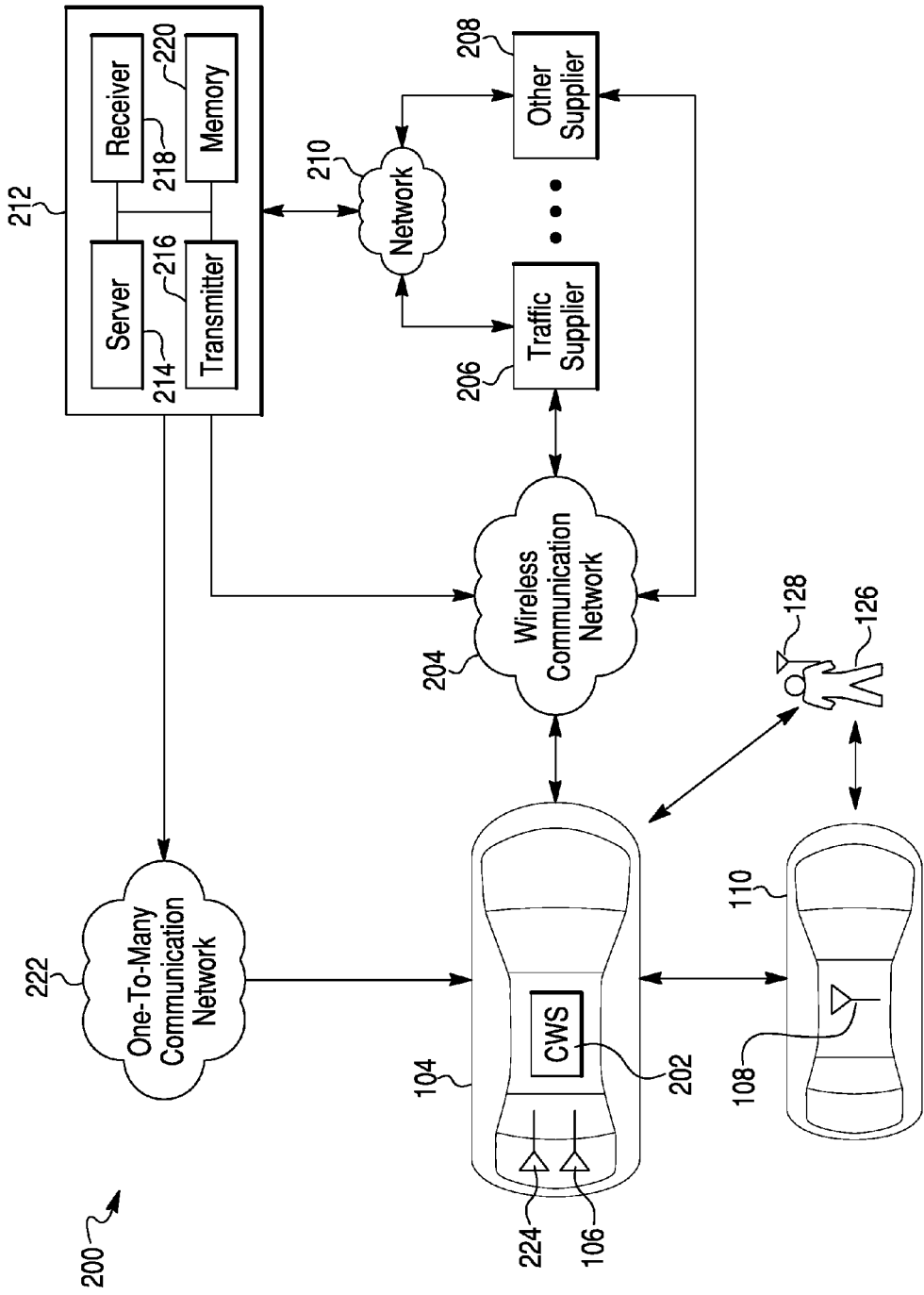
FIG. 2 is a schematic of a vehicle communication network according to aspects of the embodiments.

FIG. 2 is a schematic of a vehicle communication network 200 according to some the embodiments. Each V2X compatible user can exchange messages with any or all other V2X compatible users. As an example, vehicle 104 V2V transceiver 106 may exchange messages with V2V transceiver 108 installed in remote vehicle 110 and/or with V2P transceiver 128 carried by pedestrian 126. V2X messages can describe any collection or packet of information and/or data that can be transmitted over vehicle communication network 200. Messages may take the form of basic safety messages and/or may contain more information than basic safety messages, such as commands that can control another vehicle's automated driving system. V2X messages may include any number of bytes of information or data. Some of the embodiments are intended to include exchanging information and messages between networked vehicles and VRUs that may be useful in facilitating vehicle safety. For example, the information may be useful for a particular vehicle in order to warn a vehicle or broadcast a warning to a group of V2X users.

Vehicle 104 includes a collision warning system (CWS) 202 that can receive and assess safety information and data. The CWS 202 can constitute an implementation of a collision avoidance technology to assess the risk of a collision of the subject vehicle with another vehicle, pedestrian, entity, etc., and can alert a driver through visual and audible warnings.

Components of CWS 202 can exchange safety messages, warnings and alerts, and/or other useful information with V2X users via V2V transceiver 106. CWS 202 may transmit and receive information directly or indirectly to and from a service provider 212 over a wireless communication network 204. In one embodiment, vehicle 104 is connected with the service provider 212 by way of a one-to-many communication network 222. In an embodiment, the service provider 212 includes a remote server 214, a remote transmitter 216, a remote receiver 218, and a remote memory 220 that are configured to be in communication with one another. The one-to-many communication network 222 can include systems that can send information from one source to a plurality of receivers. Examples of one-to-many communication networks can include television, radio, satellite networks, etc.

In FIG. 2, V2V transmitter 106 can be used by the CWS 202 to receive and transmit information to and from the service provider 212 and other information providers through wireless communication network 204 and broadband network 210, such as the Internet. In alternative embodiments, an RF transceiver 224 can be used by the CWS 202 to receive and transmit information to and from the service provider 212 through wireless communication network 204 and broadband network 210, such as the Internet. RF transmitter 224 can include, but is not limited to, a wireless phone, a wireless modem, a Wi-Fi compatible transceiver, and/or any other device that communicates with other networks using a wireless communication network 204. V2V transmitter 106 can also receive and transmit information to and from traffic data supplier 206 and/or other information supplier 208. This information can include, but is not limited to, train schedules, high-traffic event schedules, other transport related data, etc. Traffic data supplier 206 and other information supplier 208 can communicate with service provider 212 through network 210.

In an embodiment, service provider 212 may be linked to vehicles through a network connection, such as via cellular network antenna 142 (see FIG. 1), and/or other network connection. Further, any other wireless communication system capable of delivering data may be used such as satellite Wi-Fi, WiMAX, microwave, etc. Service provider 212 may also be linked by a wired connection, such as broadband cable or fiber optic connections, Ethernet, DSL, ADSL, telephone modems, and/or any other wired communication system capable of delivering data. Some of the embodiments are intended to include each V2X transceiver configured to communicate with wireless communication network 204 through cellular network antenna 142, or I2V (infrastructure-to-vehicle) network connection.

II. Service Provider

Figure 3:
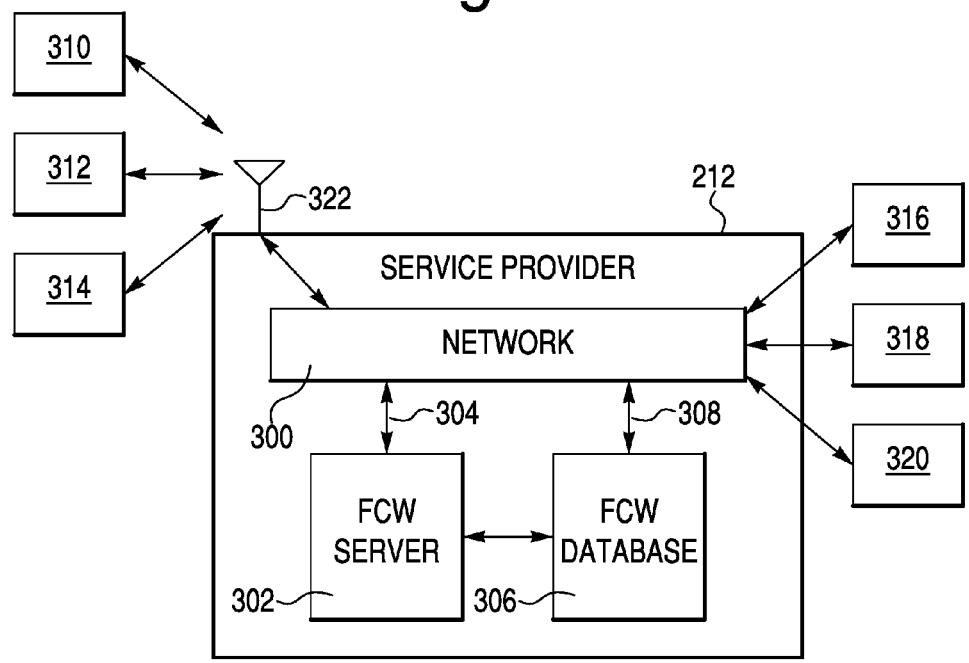
FIG. 3 is a schematic of an embodiment for a service provider of the vehicle communication network of FIG. 2.

FIG. 3 is a schematic of an embodiment of service provider 212 of the vehicle communication network 200. In FIG. 3, service provider 212 may include a computer controlled service provider network 300, a forward collision warning (FCW) server 302, and a forward collision warning (FCW) database 306. FWC server 302 and FCW database 306 may communicate, through service provider network connections 304 and 308, respectively, to service provider network 300. Alternatively, this communication can be performed directly. The service provider network 300 can be capable of communicating with one or more internal and external computer or communication networks, computer systems, or controller systems. In some embodiments, FCW database 306 is stored on FCW server 302. However in other embodiments, FCW database 306 may be partially or fully located remote from service provider 212.

FCW server 302 and FCW database 306 can include processors, memory, and instructions to operate as a computer. FCW server 302 may interact with FCW database 306 to access collision event data and/or information, such as graphics, maps, images, videos, navigational data, or any other data that can be useful to collision warning system 202. FCW database 306 may be organized using any known, related art and/or later developed data storage method and/or structure. FCW database 306 may include hard drives, flash drives, magnetic drives with removable storage media, such as disks or tape, or optical drives with removable storage media, such as discs, memory sticks, memory cards, embedded or discrete flash memory, and/or any other type of memory.

Event data may be transmitted to service provider 212 either wirelessly or through wired connections in any manner known or presently unknown the art, such as via transmitter/receiver 322 shown in FIG. 3. Event data may be received wirelessly via first, second, and third data providers 310, 312, 314, which can be users in vehicle communication network 200 transmitting event data. For example, vehicle 104, remote vehicle 110, bicycle 120, pedestrian 126, and motorcycle 130 can transmit real time event data that is received and processed by FCW server 302. The embodiments are intended to also include event data provided via fourth, fifth, and sixth data providers 316, 318, 320, which may include data from commercial information providers, traffic data providers, web cams, or government agencies (such as a state or federal departments of transportation). Fourth, fifth, and sixth data providers 316, 318, 320 can provide location and traffic information to service provider 212, such as school locations and schedules, bicycle zones, construction projects, temporary road closings, train locations and schedules, weather updates, major events, such as concerts and athletic competitions, and/or navigation map feature updates.

III. Collision Warning System

Figure 4:
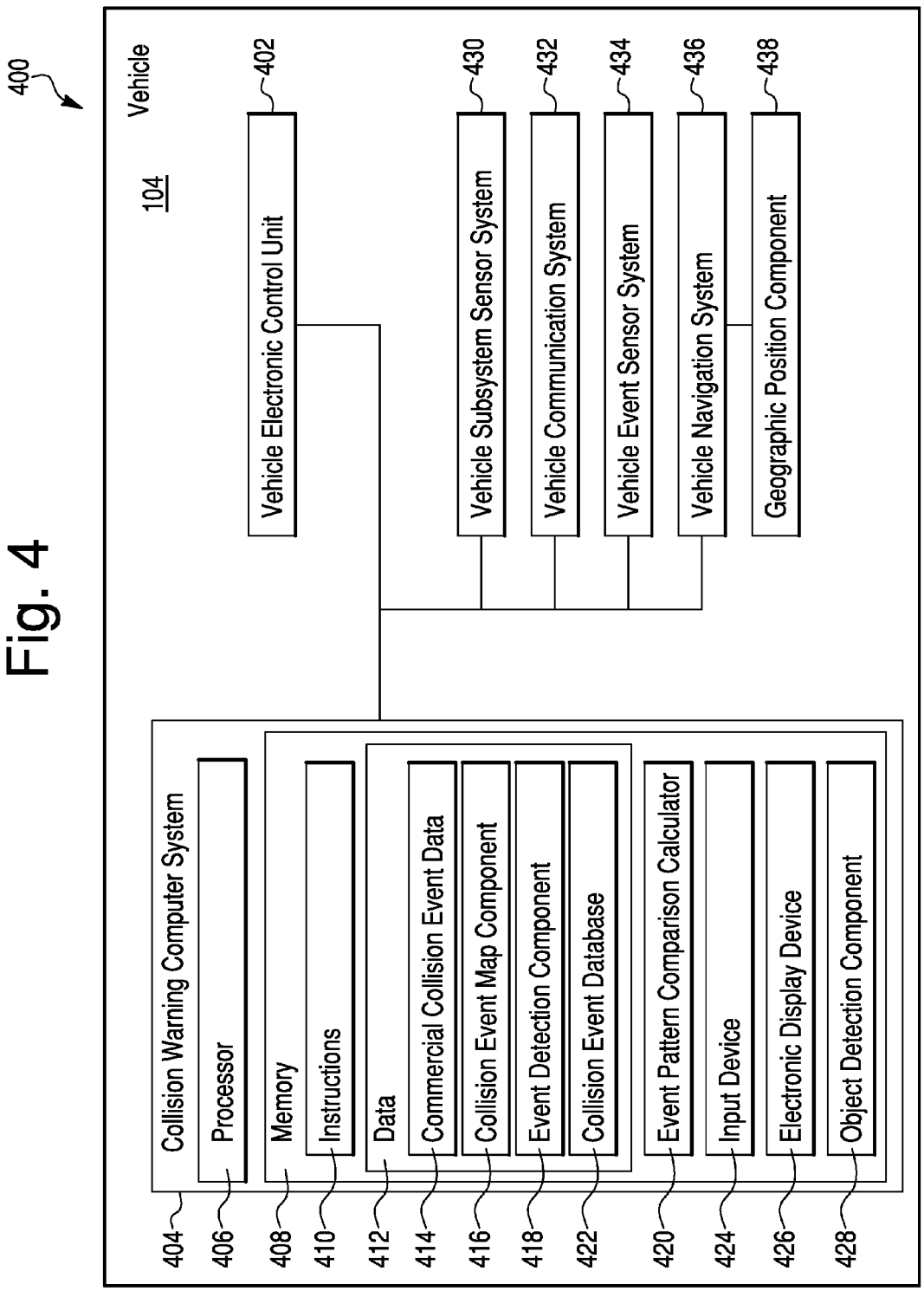
FIG. 4 is a schematic of a collision warning system of the vehicle communications network shown in FIG. 2.

FIG. 4 is a schematic of the CWS 202 of the vehicle 104 of FIG. 2. However, the disclosed CWS 202 may be associated with other vehicles or used in other applications. Other collision warning systems associated with some vehicles may include different elements and/or arrangements as configured to collision warning system 202, but may be configured to communicate over vehicle communication network 200 with one or more other collision warning systems 202. The CWS shown in FIG. 4 is designated with reference number 400 to clearly express the intention to also or alternatively use the system by other entities or in other applications.

The vehicle 104 may have one or more computers, such as a collision warning computer system 404 ("computer system") containing a processor 406, a memory 408 and other components typically present in general or special purpose computers. In some embodiments, the CWS 400 may include programmable logic circuits and/or pre-configured logic circuits for executing collision warning system functions. The memory 408 stores information accessible by processor 406 including instructions 410 and data 412 that may be executed or otherwise used by the processor 406. The control logic (in this example, software instructions or computer program code), when executed by processor 406, causes processor 406 to perform the functions of the embodiments as described herein. The memory 408 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the instructions and data are stored on different types of media.

The instructions 410 may be any set of instructions to be executed directly (such as machine code) or indirectly (such as scripts) by the processor 406. For example, the instructions may be stored as computer code on the computer-readable medium. In this regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 412 may be retrieved, stored or modified by processor 406 in accordance with the instructions 410. For instance, although the system is not limited by any particular data structure, the data may be stored in computer registers, in a relational database as a table having a plurality of different fields and records, XML documents or flat files. The data may also be formatted in any computer-readable format. The data may include any information sufficient to identify the relevant information, such as numbers, descriptive text, proprietary codes, references to data stored in other areas of the same memory or different memories (including other network locations) or information that is used by a function to calculate the relevant data.

The processor 406 may be any known, related art or later developed processor. Alternatively, the processor may be a dedicated device, such as an ASIC or DSP. Although FIG. 4 illustrates the processor 406, memory 408, and other elements of computer system 404 as being within the same block, it will be understood by those of ordinary skill in the art that the processor 406 and memory 408 may actually include multiple processors and memories that may or may not be stored within the same physical housing. For example, memory 408 may be a hard drive or other storage media located in a housing that is different from that of computer system 404. Accordingly, references to a processor or computer will be understood to include references to a collection of processors, computers or memories that may or may not operate in parallel. Rather than using a single processor to perform the steps described herein, some of the components, such as steering components and deceleration components, may each have their own processor that only performs calculations related to the component's specific function.

In an alternative embodiment, the processor 406 may be located remote from the vehicle 104 and communicate with the vehicle wirelessly. In the embodiments, some of the processes described herein are executed on a processor disposed within the vehicle 104, and others by a remote processor.

Computer system 404 may include all of the components normally used in connection with a computer, such as a central processing unit (CPU) (e.g. processor 406), the memory 408 (e.g., RAM and internal hard drives) storing data 412 and instructions 410, such as a web browser, a display device 426 (e.g., a monitor having a screen, a small LCD touch-screen or any other electrical device that is operable to display information), user input device 424 (e.g., a mouse, keyboard, touch screen and/or microphone), as well as various sensors (e.g. a video camera) for gathering sensor data as collision event data. The computer system 404 can also include components not normally associated with general purpose computers, such as object detection component 428.

The computer system 404 may be capable of communicating with various components of the vehicle 104. For example, computer system 404 may be in communication with the vehicle's electronic control unit (ECU) 402 and may send and receive information from the various systems of vehicle 104, for example a vehicle subsystem sensor system 430, a vehicle communication system 432, a vehicle event sensor system 434, and a vehicle navigation system 436. When engaged, computer system 404 may control some or all of these functions of vehicle 104. It will be understood that, although various systems and computer system 404 are shown within vehicle 104, these elements may be external to vehicle 104 and/or physically separated by large distances.

As indicated above, the vehicle 104 may also include the vehicle subsystem sensor system 430. The computer system 404 may communicate with sensors in one or more vehicle subsystems in order to calculate levels of potential collision risks based on speed, direction, acceleration, braking, and/or other factors. The vehicle subsystem sensor system 430 may include, but is not limited to, engine oil/coolant sensing systems, transmission oil sensing systems, brake sensing systems, steering and control sensing systems, fuel storage sensing systems, torque sensors, and speed and acceleration/deceleration sensors, and inertia (yaw) sensor systems.

As indicated above, the vehicle 104 may also include the vehicle communication system 432. The computer system 404 may communicate with external communication apparatus for sending and receiving collision event data. For instance, the vehicle communication system 432 includes vehicle V2V transceiver 106 that can communicate with compatible V2X transceivers in the vehicle communication network 200. As described previously in relation to FIG. 2, the vehicle communication system 432 can include the RF transceiver 224 for communicating wirelessly to service provider 212 or traffic data supplier 206 through wireless network 204.

As further indicated above, the vehicle 104 may also include the vehicle event sensor system 434 for collecting event data. Event data can include detecting the location, orientation, heading, etc., of entities external to the vehicle 104, such as other vehicles, bicycles, and motorcycles, pedestrians, obstacles in the roadway, traffic signals, signs, wildlife, trees, or any entity that can provide information to collision warning system 400. The phrases "event data" and "collision event data" can include any data related to an entity or situation, such as a vehicle, person, environmental scenario, or wildlife that is a road hazard, potential road hazard, predicted road hazard, probably road hazard, or unknown road hazard that can be a danger to a moving vehicle or other entity. In alternative embodiments, the phrases "event data" and "collision event data" can include any data related to entities or sensed data a vehicle's environment that is useful for the collision warning system 202.

A vehicle event sensor system 434 may collect sensor data from sensor apparatus including radar, lidar, sonar, cameras, V2X transceivers or any other detection devices which can record event data that can be processed by the computer system 404. Vehicle sensor systems and V2X communication systems can provide data that is processed by the computer system 404 in real-time. In other words, the sensors may continuously update their output to reflect the environment being sensed at or over a range of time, and continuously or as-demanded to provide updated output to the computer system 404. An event pattern comparison calculator can perform statistical and predictive calculations to determine if, based on two or more users' current position data, course heading data, course history data, projected course data, kinematic data, range or distance data, speed and acceleration data, and/or location data, there is a potential risk of collision events in the real-time traffic scenario. Examples of such collision events include, but are not limited to, motorcycle and vehicular traffic, bicycle traffic, pedestrian traffic, objects falling or felled in a roadway (such as rocks or trees), wildlife, domestic animals, flooded roads, or any other condition or environmental situation that could cause an unexpected road hazard. Further, collision event data can include any static or dynamic data and information that are provided in prepared traffic hazard models that could be relevant to the functions of the computer system 404.

Data for a potential collision event can be classified as location based, time based, scenario based, hazard or risk based, or another classification or a combination of classifications. Event data from various sources within and external to vehicle 104 can be saved in a data logger in a vehicle collision event database 422.

In addition to processing data provided by the various sensors, the computer system 404 may rely on environmental data that was obtained at a previous point in time and previous location either by vehicle 104, remote vehicle 110 or other vehicles in vehicle communication network 200, and is expected to persist regardless of the vehicle's presence in the environment.

As shown in FIG. 4, a memory 408 component for data 412 may include components for commercial collision event data 414, a collision event map component 416, an event detection component 418, the event comparison calculator (comparison calculator) and the collision event database 422.

Collision event map information can be generated by collision event map component 416. Collision event map information can include maps identifying the shape and elevation of roadways, lane lines, intersections, crosswalks, bicycle lanes, school zones, speed limits, traffic signals, buildings, signs, real time traffic information, or other transport information. For example, the map information may include one or more mapped networks of information, such as roads, lanes, intersections, and the connections between these features. Each feature may be stored as map data, and may be associated with information, such as a geographic location, and whether or not it is linked to other related features, e.g., a stop sign may be linked to a road and an intersection, etc. Data 412 may also include commercial collision event data 414, which can include commercially-available databases of transport data, traffic data, traffic schedules, and any other data that could be useful for the embodiments.

The event detection component 418 can include processes and instructions 410 for detecting event characteristics or information from data and information collected by the CWS 400. The event detection component can include an image recognition component that can match image and video collected from the CWS 400 with prior images and video that have been identified as related to a potential collision event.

The vehicle navigation system 436 can be interoperable with computer system 404 to provide navigation maps and information to vehicle 104. Vehicle navigation system 436 may be any type of known, related or later developed navigational system. The phrase "navigation information" refers to any information that can be used to assist vehicle 104 in navigating a road or path. Navigation information may include traffic data, map data, and road classification information data. Examples of navigation information can include street addresses, street names, street or address numbers, intersection information, points of interest, parks, bodies of water, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European).

The vehicle 104 may also include a geographic position component 438 as part of vehicle navigation system 436 for determining the geographic location of vehicle 104. For example, the geographic position component 438 may include a GPS receiver 510 (see FIG. 5) to determine the device's latitude, longitude and/or altitude position. Other location systems, such as laser-based localization systems, inertial-aided GPS, or camera-based localization may also be used to identify the location of the vehicle. The location of the vehicle 104 may include an absolute geographical location, such as latitude, longitude, and altitude as well as relative location information, such as location relative to other vehicles in an immediately vicinity. A GPS receiver 510 may be used for gathering additional information associated with vehicle 104 that includes, but is not limited to, speed, location, trajectory, distance traveled, acceleration, and other dynamic vehicle information. In alternative embodiments, the vehicle 104 may also include other features in communication with the computer system 404, such as an accelerometer, a gyroscope, or another direction/speed detection device to determine the direction and speed of the vehicle or changes thereto.

Vehicle 104 may include other apparatus for communicating, and in some cases controlling, the various components associated with vehicle subsystems. ECU 402 may be configured to communicate with, and/or control, various components of vehicle 104. ECU 402 may communication with a vehicle subsystem 504 (shown in FIG. 5) through appropriate wired or wireless communication channels.

IV. Vehicle Systems Associated with the Collision Warning System

Figure 5:
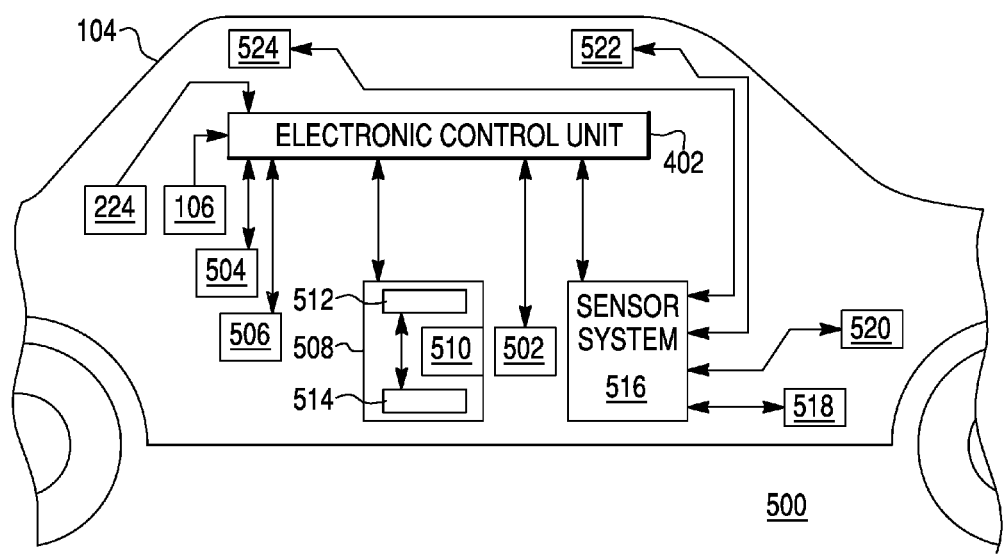
FIG. 5 is a schematic of vehicle systems that can be associated with the collision warning system of FIG. 4.

FIG. 5 is a schematic showing vehicle systems 500 that can be associated with the collision warning system 400 of FIG. 4. As shown in FIG. 5, ECU 402 can communicate with a data logger system 502, the vehicle subsystem 504, an automated driving system 506, a navigation system 508, a vehicle sensor system 516, the vehicle V2V transceiver 106, RF transceiver 224, a camera 522, and a laser 524.

In the embodiments, data logger system 502 may communicate with ECU 402 in vehicle 104. Data logger system 502 can acquire and log data collected from any of the vehicle systems and subsystems for use by the computer system 404. Data relevant to collision warning system 202 includes, but is not limited to, navigation data, sensor data, multimedia data, such as images or video streams, audio information, scanner data, and other type of data useful for collision warning system 202.

ECU 402 may communicate with a vehicle subsystem 504 through appropriate wired or wireless communication channels. The automated driving system 506 can be in communication with ECU 402. In some embodiments, ECU 402 may be configured to control components of vehicle subsystems, for example, to activate a brake actuator prior to an imminent collision. In other embodiments, automated driving system 506 can be configured to mechanically alert a driver of vehicle 104 of a potential collision, or assist the driver of vehicle 104 or another vehicle in communication with vehicle 104 to avoid a road hazard or potential collision.

Vehicle 104 can include navigation system 508 that is configured to be in communication with ECU 402, and perform the functions of vehicle navigation system 436. Navigation system 508 may include a navigation system display 512, and can store map and location information in a navigation database 514. Navigation system display 512 may display navigational maps and information to a user of vehicle 104 using any type of display technology known or presently unknown in the art. Navigation system display 512 may also communicate information to a vehicle 104 user using any type of known, related art or later developed audio technology, such as by using predetermined sounds or electronically generated speech.

In an embodiment, vehicle sensor system 516 can communicate with ECU 402 and various event data sensor devices, such as sensor 518, radar system 520, camera 522, and laser 524, disposed at the interior or exterior of vehicle 104. The sensors 518, 520, 522, 524 can be located in any beneficial area of vehicle 104. The embodiments are intended to include or otherwise cover any number the sensors that can be placed at any location of vehicle 104 in any configuration.

Sensor system 516 may communicate with multiple devices that assist in collecting data including, but not limited to, sensors 518 that can collect data for vehicle speed, steering, and inertia (yaw) relative to gravity or a perpendicular plane to gravity. Although one sensor 518 is shown in FIG. 5, it is understood that sensor 518 is a representation of one or more sensors installed within or outside of vehicle 104. Other embodiments of sensors 518 can collect proximity data using rear, front, and side proximity detection sensors 518.

The vehicle sensor system 516 can include devices to detect one or more characteristics of a road hazard, such as the presence of a vehicle, pedestrian, entity, or traffic-related situation. Characteristics can include identity, speed, direction, location, acceleration, orientation, size, etc. Examples of sensor system detection devices include, but are not limited to, one or more cameras, radar, sonar, range finding lasers, or any detection devices that can be useful for collecting collision event data in collision event database 422 that can be processed by the computer system 404. Sensor system 516 devices can be advantageous by collecting data for identification and tracking the movement of entities such as motorcycle and vehicular traffic, bicycle traffic, pedestrian traffic, objects fallen in a roadway, such as rocks or trees, wildlife, domestic animals, or any other condition, entity, or vehicle that could provide useful data for processing as collision event data.

One or more of the radar systems 520 may be mounted on a front, rear, top, or side of vehicle 104. The radar system 520 can be beneficial by detecting the presence and movement of entities in proximity to vehicle 152, especially when an entity is within a driver's blind spot or obscured by darkness.

One or more of the cameras 522 may be mounted internal or external to vehicle 104. FIG. 5 illustrates camera 522 at a certain location of vehicle 104 that is merely exemplary. The embodiments are intended to include or otherwise cover any number of one or more cameras 522 that can be placed in any location and/or configuration on vehicle 104 that includes, but is not limited to, a front grill, front and rear bumpers, underneath a vehicle, on a side of vehicle 104, inside vehicle 104, or on a top of vehicle 104. In some embodiments, camera 522 may rotate vertically and horizontally to provide a wide degree of coverage area. A variety of cameras 522 may be used in the embodiments to capture still images and video images in color, infrared, black and white, in two dimensions, or in three dimensions. The camera 522 may capture images, video, and data on any type of medium known in the art, including digital media or film.

The captured images and related data may be saved to data logger system 502 for image recognition and movement characteristics processing by computer system 404. An object detection component 428 can compare images from image recognition processing with a database of images, maps, graphics, videos, etc. to identify entities, read text, or determine locations based on the image comparisons.

One or more of the lasers 524 may be mounted external to vehicle 104. Laser 524 can capture event data for processing by determining range and intensity of a vehicle, pedestrian, entity, etc., for processing by computer system 404. Laser 524 is capable of capturing range and intensity information of an entity, which can be used to determine the location and distance of the entity.

FIG. 5 also shows the vehicle 104 V2V transceiver 106 for communicating with other V2X compatible transceivers. In an embodiment, V2V transceiver 106 can collect event data from other V2X transceivers that can be configured for a pedestrian, bicycle, vehicle, building, tower, billboard, traffic signal, road sign, or any transport related entity or user. V2X transceivers can be configured to broadcast the transceiver's location, obtained from an internal GPS receiver, to any V2X transceiver within transmission range. A display on each V2X transceiver can also display any messages, images, alerts, and warnings transmitted received by V2X users in vehicle communication network 200. A communications link between V2X transceivers may be initiated by any user. In the embodiments, a V2X transceiver may continuously search for other V2X transceivers, such as by emitting a periodic signal that searches for a reply. In other embodiments, a V2X transceiver may emit periodic signals searching for a reply from an in-range V2X transceiver. If V2X transceiver replies, then a communications link may be established. Information and data received by V2V transceiver 106 related to V2X communications can be saved to data logger system 502 and processed by computer system 404.

V. Vehicle Interior

Figure 6:
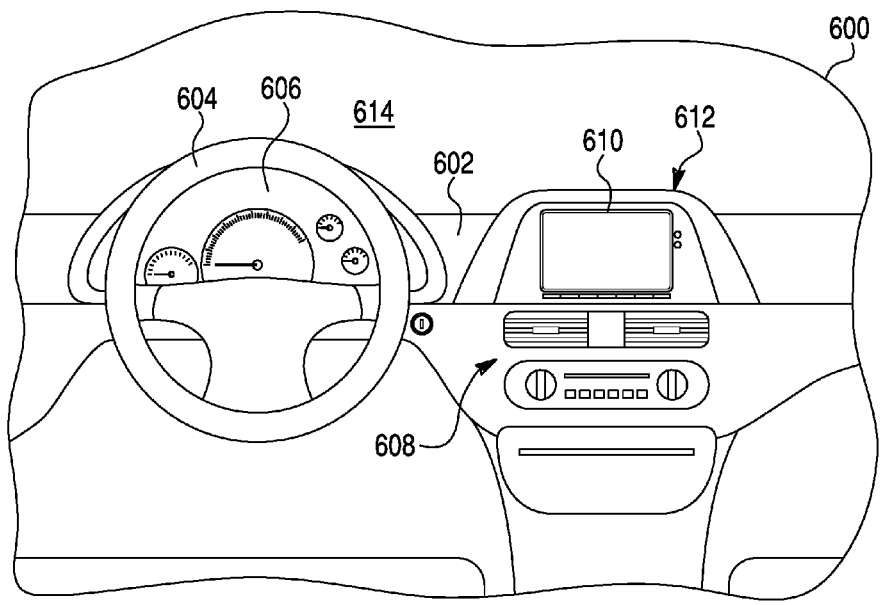
FIG. 6 is a schematic of an exemplary design of a vehicle interior associated with the collision warning system of FIG. 4.

FIG. 6 is a schematic of an exemplary design of a vehicle interior 600 associated with the collision warning system 400 of FIG. 4. The vehicle interior 600 may include, for example, a dashboard 602, a steering apparatus such as a steering wheel 604, an instrument panel 606, and a center portion 608. Center portion 608 can include one or more devices associated with the interior of the vehicle, including but are not limited to: audio devices, video devices, navigation devices, as well as any other types of devices. In addition, center portion 608 can be associated with controls for one or more systems of vehicle 104 including, but not limited to: climate control systems, radio and sound systems, and other types of systems. The vehicle 104 may also have a display device 610 for displaying information from CWS 400, and/or other related or unrelated vehicular systems. In some embodiments, vehicle 104 can include a driver vehicle interface 612 that may include the display device 610. Examples of display device 610 include, but are not limited to, LCDs, CRTs, ELDs, LEDs, OLEDs, or electronic paper displays each with or without a touchscreen, as well as other types of displays. Display device 610 can include a touchscreen for use as the user input device 424 for activating or deactivating one or more vehicle collision system modes, and for enabling a user to provide information, such as navigation destination or event information, to the computer system 404. In alternative embodiments, driver vehicle interface 612 can include buttons, a keypad, or other types of input devices 424. In another embodiment, driver vehicle interface 612 can include a projection type display that is configured to project an image onto one or more surfaces of vehicle 104, such as windshield 614.

Vehicle 104 may also include one or more additional display devices in various locations. In some embodiments, display device 610 can be disposed within center portion 608. However, in other embodiments, display device 610 can be located in any portion of vehicle 104, or can be a portable device. For example, display device 610 can be located within instrument panel 606.

In addition, while display device 610 can be configured to present visual information for computer system 404, display device 610 can be shared with other devices or systems within vehicle 104 such as vehicle navigation system 436. In an example, display device 610 may display collision event information, warning alerts, informing alerts, and navigation maps to a user.

A driver vehicle interface may inform a driver with auditory warnings or alerts a predicted potential collision. Warnings and alerts may be configured to correspond to the level of road hazard or level of potential collision risk. For example, warnings and alerts may be classified as low, medium, high, or information. Display device 610 can be configured to display no image when no alert or information has been issued by computer system 404. In an embodiment, display device 610 displays a default screen, such as a blank screen, when no alert is issued. However, in embodiments where display device 610 is used for displaying information from other systems, a default screen cannot remain a blank screen with no image. For example, in embodiments where display device 610 is shared with vehicle navigational system 436, display device 610 can continue to display maps and information received from the vehicle navigation system 436 until a warning is issued. Likewise, once a warning has expired, display device 610 can return to displaying maps from navigation system 436.

VI. Methods of Operation

FIG. 1 shows an overhead view of the traffic scenario 100. The users, locations, and other data related to potential road hazard scenarios at intersection 102 can be the subject of digital navigation maps generated by the collision event map component 416 for integration with digital navigation system 436 that can be displayed on display device 610. The intersection 102 is merely provided as an exemplary location in order to illustrate embodiments of CWS 400 and is not intended to be limiting. The embodiments of the disclosure are intended to cover any road, highway, path, lane, course, track, navigable waterway, and paved or unpaved areas that a vehicle, bicycle, motorcycle, pedestrian, boat, train, etc. could move on, along, or through.

Exemplary aspects of intersection 102 include two lanes in multiple directions and bicycle lane 124 that traverses only one direction. The embodiments, however, are not limited by a number of lanes, directions, or to an intersection. Any configuration of a road, highway, path, lane, course, track, navigable waterway, and paved or unpaved areas may be used to operate and implement the embodiments.

CWS 400 can collect collision event data at or near intersection 102 from multiple sources in vehicle 104, for example V2X signals from other vehicles and users, vehicle event sensor system 434, navigation system 508, and user input on input device 424. CWS 400 activation enables collection of new event data while vehicle 104 approaches and passes through intersection 102.

Computer system 404 can process the new event data, compare the new event data from one vehicle to historical event data that the same vehicle or other vehicles collected at the same or proximate location, and generate a prediction as to whether the vehicle should be provided with information relating to a potential collision or provided an alert of a potential collision scenario. The operations of the CWS 400 are described in conjunction with embodiments of the disclosure below.

In an embodiment, an event pattern comparison calculator (comparison calculator) 420 may be utilized by computer system 404 to compare new event data with prior event data in collision event database 422 and prior event patterns. If the comparison calculator 420 determines the new event data meets a comparison threshold to a prior event pattern, the new event data is determined to be updated data for the prior event, and the new event data can be combined with data for a prior event pattern. In the embodiments, the comparison calculator 420 can utilize one or more comparison models of statistical analysis to classify patterns of road hazards or potential road hazards as potential collision events. Comparison calculator 420 can compare event data to one or more patterns including, but not limited to, statistical models, data clusters, regression analysis, or any other type of data analysis which can perform the functions of the embodiments. Comparison calculator 420 may provide at least one weighting factor in the comparison models to weight various probabilities associated with road hazards determined from event data collected in real-time or historical event data.

The comparison calculator 420 can analyze new event data to determine a statistical match with existing, or prior, road hazard event data. In an embodiment, the comparison calculator 420 may determine a statistical match using probabilities calculated from the data. Comparison calculator 420 may further calculate statistical matches based on dates and times, road hazard characteristics, environmental conditions, traffic conditions, locations, entity headings, or any other condition or data analysis relevant for the embodiments.

In an embodiment, comparison calculator 420 may use a single equation that is derived using Bayes' Theorem or Bayesian Rule. Generally, Bayes' Theorem relates the conditional and marginal probabilities of various random events. Using a Bayesian Rule, probabilities of different events occurring may be determined given certain observed scenarios. As a result, the probability of an event occurring generally increases as more prior information from observed scenarios is provided. The comparison calculator 420 may use a Bayesian Rule to combine the various probabilities determined based on conditions associated with any of the ranges or patterns of event data in collision event database 422. If comparison calculator 420 determines that newly-collected event data has a statistical match to historical event data, then the comparison calculator 420 stores the new event data into collision event database 422 with the matched prior event data. If the comparison calculator 420 determines that the new event data is not a statistical match to historical event data, new event data is stored into collision event database 422 as a single event. Single event data in collision event database 422 can be further analyzed by the comparison calculator 420 in future statistical analysis to determine if any statistically significant matches occur with other event data obtained from the same vehicle and/or other vehicles.

While some of the embodiments are based on an application of Bayes' Theorem, other embodiments are intended to include or otherwise cover other comparison methods by the comparison calculator 420. The comparison calculator 420 may utilize fuzzy logic, neural network applications, analysis of variance (ANOVA), discriminant analysis, or any other appropriate analytical and/or statistical methods to perform data analysis.

Figure 7:
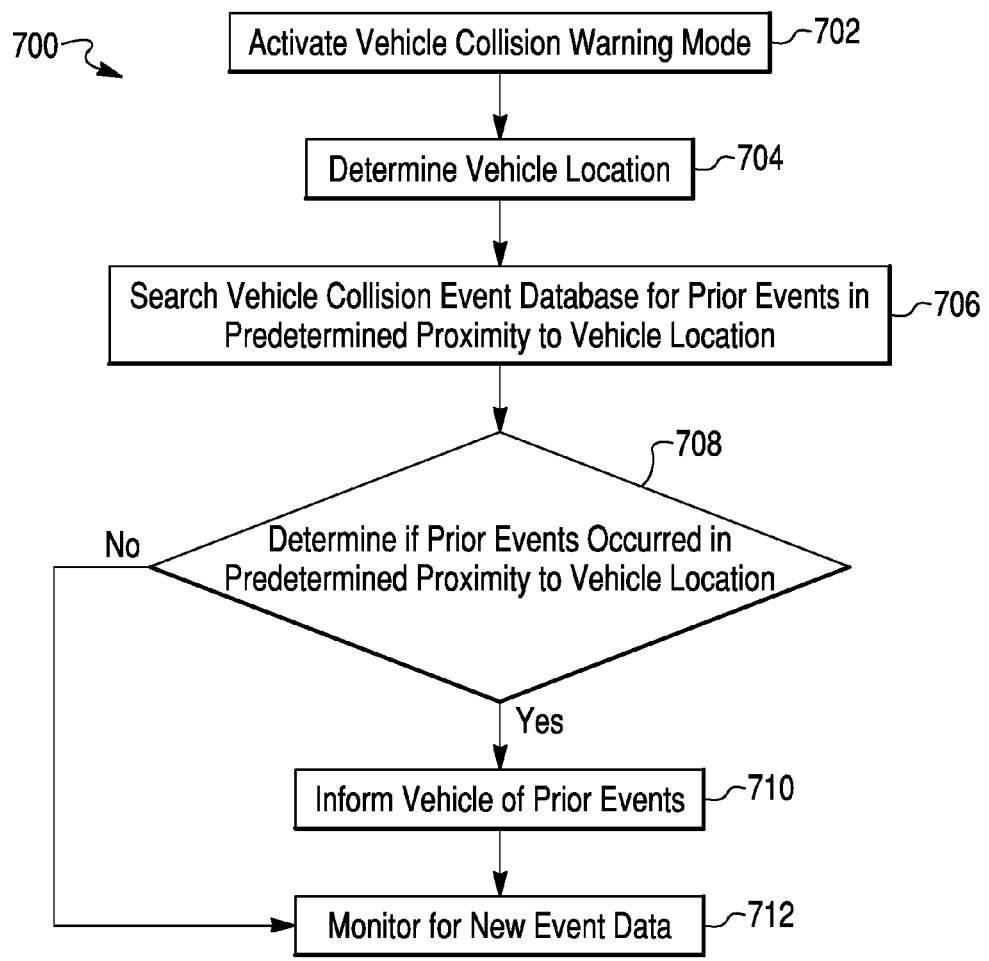
FIG. 7 is a flowchart of an exemplary method to inform a vehicle of potential collision events in conjunction with the collision warning system of FIG. 4.

FIG. 7 is a flowchart of an exemplary method 700 to inform a vehicle of potential collision events in association with the CWS 400. In some embodiments, warnings and alerts may be generated not only on signals from V2X signals but also on probabilities of an event analyzed by the comparison calculator 420. For example, if the vehicle 104 approaches the intersection 102, the V2V transceiver 106 should receive a V2P signal from the single pedestrian 126. However, multiple scenarios can occur where V2P signals may not be present and/or detected due to, for example, a malfunction in the V2P transceiver 128 or radio frequency interference. However, CWS 400 may generate a low level and/or information alert regarding a predicted potential for pedestrian 126 crossing the intersection 102 based on statistical analysis of historical pedestrian data by comparison calculator 420.

In FIG. 7, the method to inform a vehicle may include step 702 where a user, driver or passenger of vehicle 104 can activate a vehicle collision warning mode for the CWS 400. The method may include step 704 to determine the vehicle 104 location. A location may be determined using geographic position component 438. After a location is determined, in step 706 the computer system 404 can search collision event database 422 for prior events in a predetermined proximity to the location of vehicle 104. If in decision 708, to determine if prior events occurred, no prior events occurred in proximity to the current vehicle 104 location, then the method proceeds to step 712 to monitor for new road hazards. If in decision 708, to determine if prior collision events occurred, there are prior events within the predetermined proximity to vehicle 104, the method can include step 710 to inform vehicle 104 of the prior events. The step 710 to inform vehicle 104 includes the collision event map component 416 integrating potential road hazard data from collision event database 422 into detailed maps that can be used by the computer system 404 for generating alerts as well as used by the vehicle navigation system 436 for displaying on display device 426 the locations and types of road hazards onto a digital navigation map.

Figure 8:
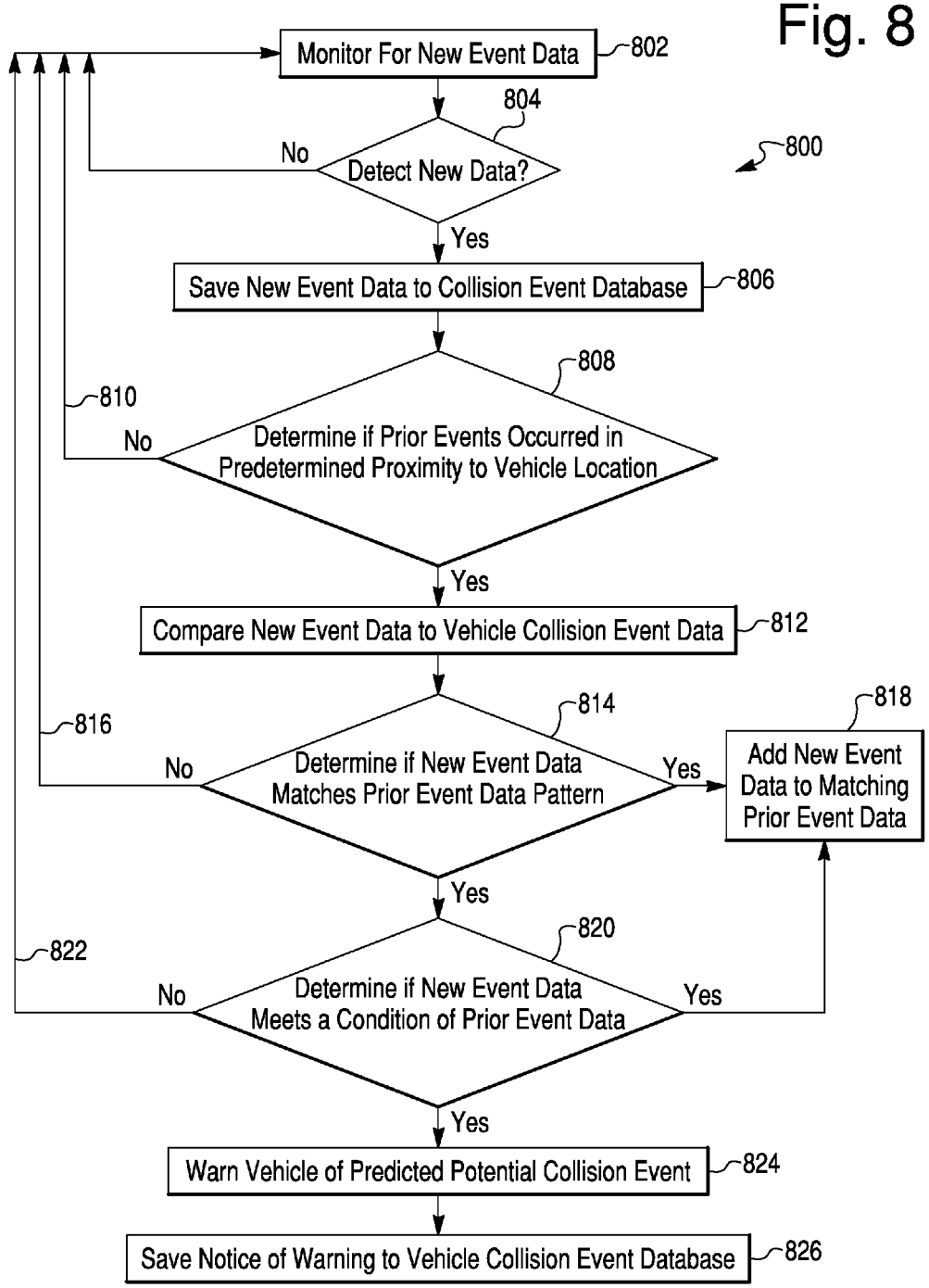
FIG. 8 is a flowchart of an exemplary method to predict potential collision events and alert a vehicle in conjunction with the collision warning system of FIG. 4.

FIG. 8 is a flowchart of an exemplary method 800 to predict potential collision events and alert a vehicle in conjunction with the collision warning system 212. The method illustrated in FIG. 8 can monitor for new event data in step 802 that can be a continuation of step 712, to monitor for new event data, of FIG. 7. Monitoring for road hazards using new event data can be performed automatically, manually, or a combination of automatic and manual identification of event data. As stated previously, event data can include, but is not limited to, V2X signals, type of user or vehicle, navigation data, road hazard data, collision warning data, course heading data, course history data, projected course data, kinematic data, current position data, range or distance data, speed and acceleration data, location data, vehicle sensory data, vehicle subsystem data, or any type and quantity of data useful for processing by computer system 404.

If new event data is not detected at step 804, to detect new event data, then the method returns to step 802 to continue to monitor for new event data. If a new event, and therefore new event data, is detected in 804, the method can include step 806 to save new event data into collision event database 422. New event data may also include a new road hazard that has been identified by a vehicle or received from an external database. However, new event data can also include a repeated entry of a road hazard by a vehicle 104 or other vehicles at or in a predetermined proximity to an event location that already exists in collision event database 422.

A repeated sighting or entry of a road hazard or potential road hazard can add confidence to collision event data collected for the road hazard. For example, an event location can be identified by geographic position component 438 and a road hazard can be recognized from camera 522. The event location and road hazard can be automatically saved into collision event database 422. In another embodiment, a driver of vehicle 104 may observe a traffic scenario, for example a school bus stop, and use input device 424 to manually save the event location into collision event database 422. While the example describes a school bus stop, it is understood that any type of event scenario, road hazard, traffic data, image, or location can be automatically or manually saved into collision event database 422. The method, therefore, can collect data for a potential road hazard and the event location, regardless of whether the event was previously identified and saved.

The method in FIG. 8 may also include decision 808 to determine if prior road hazard events occurred in a predetermined proximity to the vehicle location. After new event data is detected in step 804, to detect new event data, the computer system 404 can search collision event database 422 for prior events in a predetermined proximity to the location of vehicle 104. In step 808, to determine if prior event occurred, no prior events occurred in proximity to the current vehicle 104 location, then the method will return at 810 to monitor for new event data. If prior events did occur, then the method proceeds to step 812 to compare, using comparison calculator 420, new event data to prior event data for the same location from collision event database 422. Comparison of new event data to prior event data in collision event database 422 can be performed by any of the comparison or statistical models and methods described above, which include but are not limited to statistical models, data clusters, regression analysis, correlations, or any other type of appropriate data analysis technique. In an exemplary embodiment, the new event data is compared with prior event data and patterns in collision event database 422 using Baysian Networks.

If the comparison calculator 420 determines in step 814, to determine if new event data matches a prior event data pattern, that new event data does not match a prior event data pattern, then the method may return at 816 to monitor for new event data. If comparison calculator determines, in step 814 to determine if new event data matches a prior and/or historical event data pattern, that new event data matches and/or correlates to a prior event data pattern, then the method can include step 818 to add new event data to the matching and/or correlating prior event data in collision event database 422.

Further, if the comparison calculator 420 determines, in step 814 to determine if new event data matches a prior event data pattern, that new event data matches and/or correlates to a prior and/or historical event data pattern, then the method optionally proceeds in step 820 to determine if new event data meets a condition and/or characteristic of the prior and/or historical event data. In step 820, the new event data should meet a threshold condition and/or characteristic of event data to qualify as a potential collision risk and/or road hazard. A condition and/or data characteristic can include, but is not limited to, a temporal component including a relevant time frame, a direction of movement and/or heading of an entity, and heading of the vehicle 104 approaching the entity, etc.

A time frame can be any time frame including, but not limited to, a time of day, a range of time within a day, a calendar day or range of days, a week or range of weeks, a month, a range of months, etc. A time frame can also be periodic, such as an event occurring certain days of every month between certain hours of the day. For example, if event data at intersection 102 correlates with a present location of vehicle 104 and statistical analysis of historical event data result in identifying an event occurring between the hours of 4:00 pm and 6:00 pm, and the vehicle 104 is at the location at 11:00 pm, then no conditional match occurs within the relevant time frame. Real-time event data collected by the vehicle 104 at the event location can still be used, however, to give further confidence to the pattern of event data characteristics or conditions, e.g., that no event occurred at the location at 11:00 pm, therefore the conditional time frame of 4:00 pm-6:00 pm remains valid.

If, in step 820 to determine if new event data meets a condition, the comparison calculator 420 determines the new event data meets a condition and/or characteristic of prior and/or historical event data, then the method may include step 824 to warn vehicle 104 of a predicted potential collision event and/or road hazard. Computer system 404 can generate an alert to a driver of vehicle 104 of the nature, location, and severity of a potential collision event using visual, audible, or mechanical indicators. A potential collision event can be a potential road hazard in the path of, or in proximity to, the location and heading of the vehicle 104 or other vehicles or users. The potential collision event may not generate an immediate road hazard alert to the vehicle 104, in which case an information alert may be appropriate. For example, if the event data analysis results in a scenario, such as a bus stop, in or near the current or intended path of vehicle 104, then an information alert can be useful to warn vehicle 104 to take caution near the bus stop location.

Visual alerts and information alerts can display on display device 610 or other display devices including, but not limited to, a smart phone, a tablet computer, or any device that can be linked by wire or wirelessly to collision warning system 400. Audible alerts and information can be provided to vehicle 104 through a speaker in the display device 610 or through other devices that include, but are not limited to, a vehicle sound system, a smart phone, a tablet computer, etc. Mechanical indicators can inform a driver of vehicle 104 through vibrations in steering wheel 604, vibrations of a brake pedal (not shown), vibrations of an accelerator pedal (not shown).

Some embodiments to warn vehicle 824 of potential road hazards and information are intended to include or otherwise cover one or more alert levels. In the embodiments, information alerts and road hazard alerts that display on display device 610 can include, but are not limited to, one or more navigation maps, symbols, icons, graphics, colors, images, photographs, videos, text, audible information, etc. Exemplary alert levels may include warning alerts, informing alerts, high, medium, and low alerts, proximity alerts, trajectory alerts, location alerts, or any alert method that can inform a driver of information, a potential road hazard, collision risk, etc. In particular, informing alerts are used to inform the vehicle 104 or other users of information or data relevant to the vehicle's intended current or intended path. Low-level hazard alerts can inform a driver of relatively low collision threats, while mid-level or high level hazard alerts can inform the vehicle 104 of medium-to-high level collision risks and/or road hazards. Information can be provided to vehicle 104 with alerts displayed on display device 610 or audible or mechanical alerts, as described above.

After generating an alert, the method may include step 826 to save the notice of the warning to the vehicle collision event database 422 with the event data relevant to the alert.

If, in step 820 to determine if new event data meets a condition, the comparison calculator 420 determines the new event data does not meet a condition of prior and/or historical event data, then the method returns at 822 to monitor for new event data in real-time.

Figure 9:
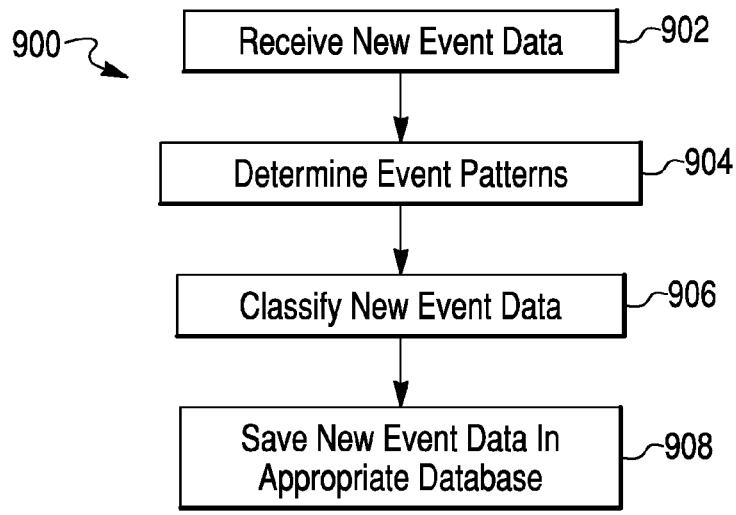
FIG. 9 is a flowchart of an exemplary method for receiving and classifying new event data in conjunction with the collision warning system of FIG. 4.

FIG. 9 is a flowchart of an exemplary method 900 for receiving and classifying new event data by the CWS 400. The method in FIG. 9 may include step 902 where computer system 404 can receive new event data. New event data may be uploaded to computer system 404 from any vehicle system including the vehicle subsystem sensor system 430, the vehicle communication system 432, the vehicle event sensor system 434, the vehicle navigation system 436, and/or manually from a driver and/or passenger of vehicle 104. In step 906, classifying new event data can include the comparison calculator 420 determining event patterns 904 using any of the comparison or statistical methods described above or another known, relevant or later developed method.

In step 906, to classify new event data, the comparison calculator 420 can search and analyze historical event data in collision event database 422 to determine if prior and/or historical road hazards and/or potential collision events occurred within a predetermined proximity to the vehicle 104 location. Comparison calculator 420 can compare current or new event data collected from vehicle 104 or other vehicles to prior and/or historical event data by any of the comparison or statistical methods described above. If new event data is a comparative or statistical match to one or more prior event data patterns, comparison calculator 420 may then classify new event data 906 according to one or more prior event data patterns. The method may further include step 908, where computer system 404 may store the new and/or current event data into the collision event database 422 with the matched or correlated prior and/or historical event data.

In an alternative embodiment, the exemplary method 900 for receiving and classifying new event data is performed by the service provider 212. To perform method 900 for receiving and classifying new event data, the FCW server 302 can include corresponding functionality and hardware as computer system 404. For example, at step 902 the FCW server 302 can receive new event data, determine event patterns 904, classify new event data 906, and save new event data in the FCW database 306.

Figure 10:
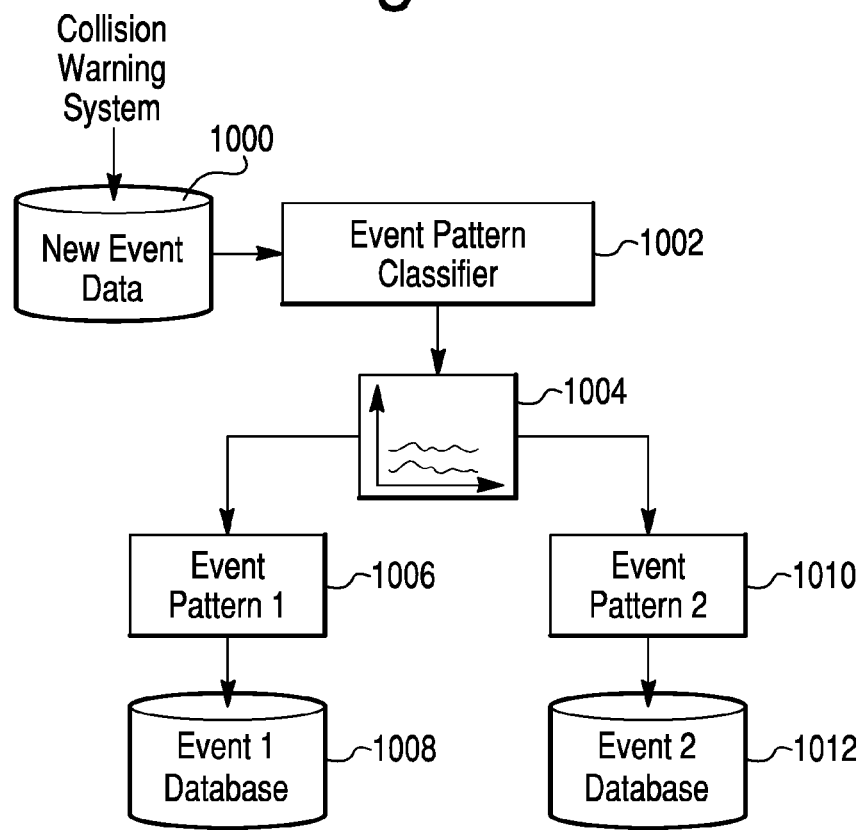
FIG. 10 is a functional flowchart of an exemplary method for comparing new event data with patterns of prior event data events in conjunction with the collision warning system of FIG. 4.

FIG. 10 is a functional flowchart of an exemplary method for comparing new event data with patterns of prior and/or historical event data by CWS 400. In an alternative embodiment, new event data 1000 is received by the CWS 400 as described above. New event data 1000 may also receive commercial collision event data via commercial collision event data component 414 from transportation agencies, commercial service providers, or from other vehicles. The method may correlate or statistically analyze new event data 1000 using an event pattern classifier 1002. The event pattern classifier 1002 can be a function of comparison calculator 420. Event pattern classifier 1002 can compare new or historical event data to one or more event patterns 1004 using comparison and/or statistical methods described above.

Alternatively, other comparison and/or statistical models can be generated, and event data matched and/or correlated to one or more of the comparison or statistical models. Additionally, event pattern classifier 1002 can compare new event data 1000 to one or more event patterns 1004 using comparison and statistical methods described above. In an alternative embodiment, event patterns 1004 may be generated by statistical analysis of event data according to a data characteristic such as location and/or time interval of the event. In some embodiments, a time interval used for determining whether new event data 1000 fits one or more event patterns 1004 may be fixed. In other embodiments, the time interval may vary. One or more event patterns 1004 can be stored in an event pattern library in collision event database 422.

If the event pattern classifier 1002 determines the new event data 1000 matches or correlates to one or more event patterns 1004, the new event data 1000 can be combined with the data associated with the one or more event patterns 1004, such as a first event pattern 1006 or a second event pattern 1008. Although two event patterns are illustrated in FIG. 10, the embodiments are intended to include, and otherwise cover, any number of event patterns. The new event data 1000 that is associated with the first event pattern 1006 may be stored with event data for the first event pattern 1006 in a first event database 1010 that is part of the collision event database 422. Likewise, the new event data 1000 that is associated with the second event pattern 1008 may be stored with event data associated with the second event pattern 1010 a second event database 1012 that is part of collision event database 422. In an alternative embodiment, the comparing new event data 1000 with event patterns 1004 may be performed by FCW server 302.

Figure 11:
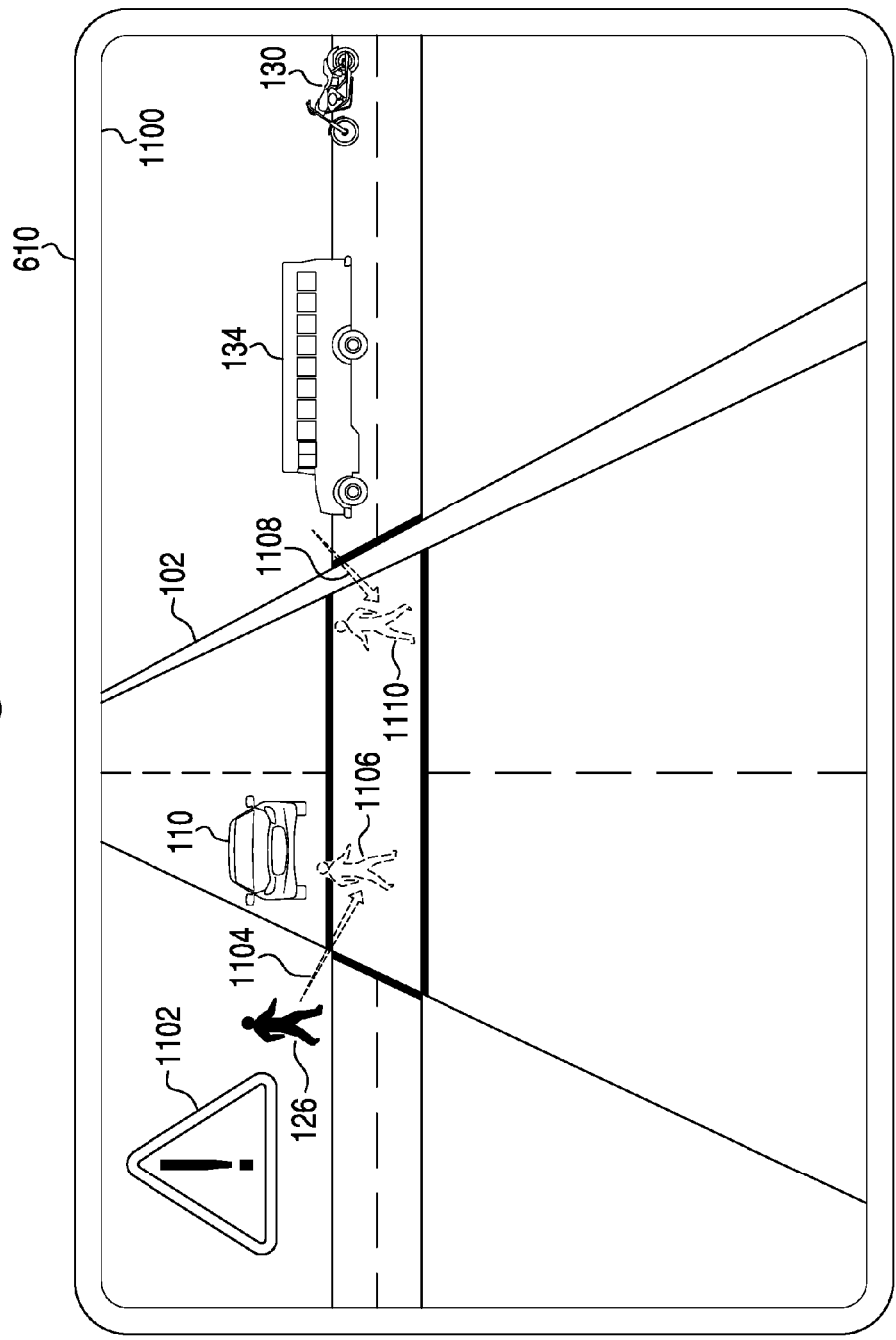
FIG. 11 illustrates an embodiment of the collision warning system of FIG. 4 alerting a vehicle of potential collision scenarios with pedestrians.
Figure 12:
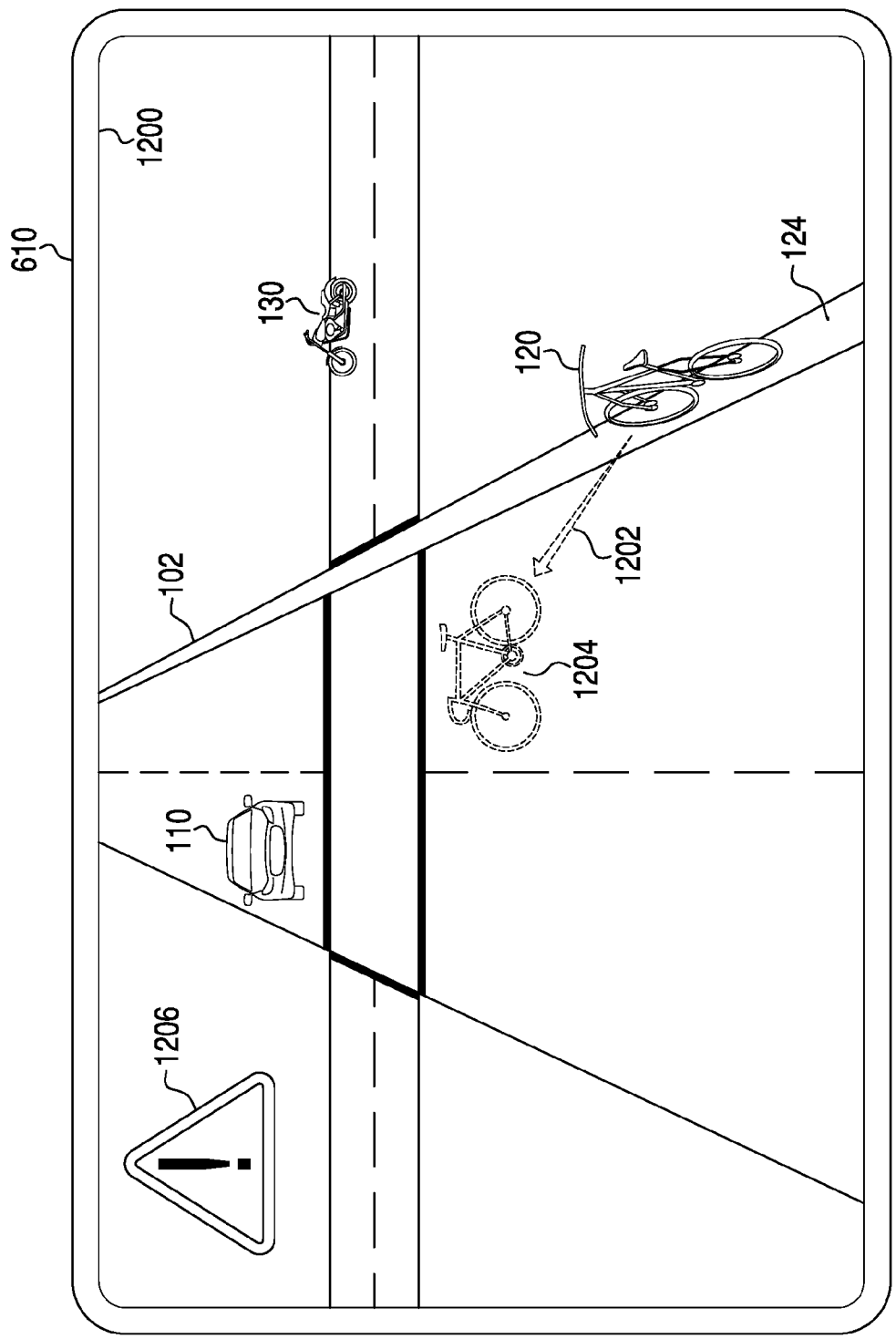
FIG. 12 illustrates an embodiment of the collision warning system of FIG. 4 alerting a vehicle of a potential collision scenario with a bicycle.
Figure 13:
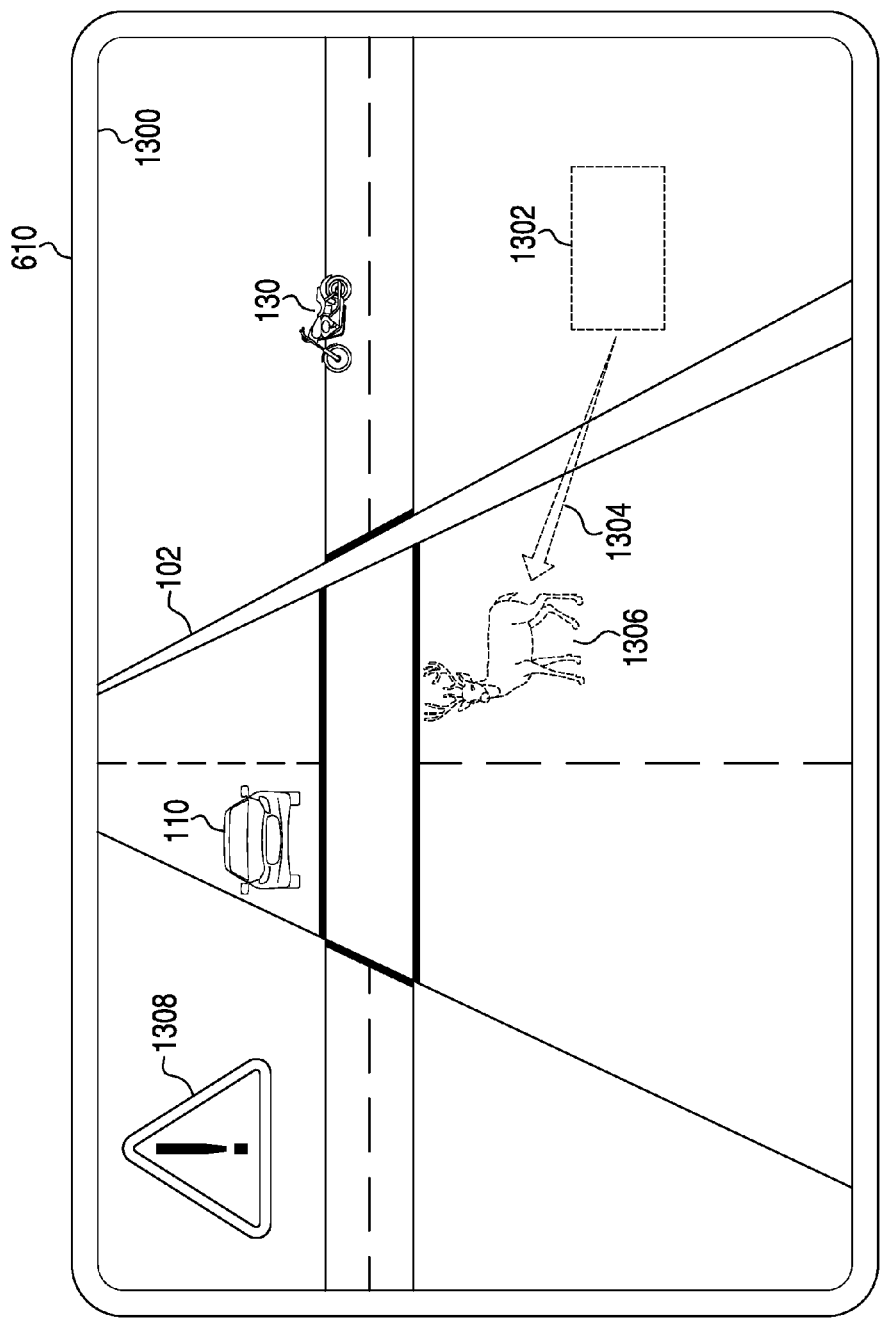
FIG. 13 illustrates an embodiment of the collision warning system of FIG. 4 alerting a vehicle of a potential collision scenario with wildlife.

FIGS. 11-13 illustrate examples of collision event maps displayed on device 610 that are generated by collision event map component 416. The scenarios should be considered as specific embodiments and should not be considered as limiting. Other embodiments are intended to include, or otherwise cover, any visual displays of information and maps that are useful for the functionality of the embodiments.

FIG. 11 illustrates an embodiment of the CWS 400 alerting a vehicle of potential collision scenarios with pedestrians. FIG. 11 shows the display device 610 displaying informing alert image 1100 that is generated by collision event map component 416. Informing alert image 1100 shows some features of the intersection 102 (see FIG. 1) from a navigation perspective of vehicle 104. In the embodiment, the computer system 404 can include prior and/or historical event data that was collected in proximity to intersection 102. Entities in proximity to intersection 102 include remote vehicle 110 that is equipped with the CWS 400 and V2V transceiver 108, the single pedestrian 126 who is equipped with V2P transceiver 128, the school bus 134 that is equipped with the CWS 400 and V2V transceiver 136, the group of pedestrians 138 who are each equipped with V2P transceivers 140, and the motorcycle 130 that is equipped with the CWS 400 and V2M transceiver 132. In the scenario, school bus 134 blocks the view of the group of pedestrians from the perspective of vehicle 104. The group of pedestrians 138 is visible to remote vehicle 110 and motorcycle 130. Therefore, the group of pedestrians 138 is a potential unseen road hazard to vehicle 104.

In the exemplary scenario, as vehicle 104 approaches intersection 102, computer system 404 searches prior event data for events based on the current location and heading of vehicle 104, provided by geographic position component 438. Computer system 404 can locate historical data for prior events in proximity to intersection 102. The prior event data indicates patterns of unexpected pedestrian movements across the intersection 102. The prior events have a data characteristic occurring weekdays between 3:00 pm to 6:00 pm. The computer system 404 detects from an internal clock that the current time is 4:00 pm and the day is a weekday.

Computer system 404 therefore determines the current time falls within the time frame characteristic for the prior events.

Computer system 404 can detect V2P, V2V, and V2M signals received through vehicle 104 V2V transceiver 106. Computer system 404 can analyze and translate V2X signals as to source, location, and telemetry, and collision event map component 416 can map the signals onto informing alert image 1100. Using GPS location information from the V2X messages, computer system 404 can direct sensor system 516 to activate camera 522 to collect images of the V2X transmitting entities. The images can be transmitted to computer system 404 for image recognition. In some embodiments, informing alert image 1100 can display icons corresponding to a type of V2X signal received, e.g., a pedestrian icon for a V2P signal or a motorcycle icon for a V2M signal. In an alternative embodiment, where images of V2X objects have been recognized, actual images of pedestrians, vehicles, motorcycles, etc. could be displayed on informing alert image 1100. Based on the V2P messages from single pedestrian 126, computer system 404 can detect movement of the V2P transceiver towards the intersection 102. Comparison calculator 420 can analyze the real time data of the V2P movement and determine, based on comparisons with prior event V2P data patterns, that the pedestrian 126 has a statistical likelihood of crossing the intersection 102 in outside of crosswalks and in the current path of vehicle 104.

To inform vehicle 104 of a potential collision event, computer system 404 can display an alert symbol 1102 on display device 610. To predict the nature of the potential collision event, computer system 404 can display movement of pedestrian 126 along a trajectory indicated by direction arrow 1104 towards intersection 102. To predict a potential movement of pedestrian 126, a pedestrian symbol 1106 can be displayed in front of direction arrow 1104. The outline of pedestrian symbol 1106 is a dashed line indicating symbol 1106 is only a predicted movement of pedestrian 126. The alert symbol 1102 and pedestrian symbol 1106 indicates that computer system 404 has determined there is a probability of pedestrian 126 crossing intersection 102 that can be a collision risk to vehicle 104. The determination is based on V2P signals combined with a calculated pattern of pedestrians crossing intersection 102 within the current time frame. By displaying informing alert image 1100 with pedestrian symbol 1106, a driver can be alerted to a potential collision risk if pedestrian 126 follows the predicted pattern of travel indicated.

A second event at the intersection 102 is determined where V2P signals from V2P transceivers 140 indicate a gathering of the group of pedestrians 138 near intersection 102. Computer system 404 can analyze movement of V2P transceivers 140 although the group of pedestrians 138 is blocked from the view of vehicle 104 by school bus 134. Comparison calculator 420 can analyze the real time data of the V2P messages and determine, based on comparisons with prior event V2P data patterns, that the group of pedestrians 138 has a statistical likelihood of crossing the intersection 102 in outside of crosswalks and in the current path of vehicle 104. To inform vehicle 104 of a potential collision event, computer system 404 displays alert symbol 1102 on display device 610. To predict the nature of the potential collision event, computer system 404 displays movement of one of the group of pedestrians 138 along a trajectory indicated by direction arrow 1108 towards intersection 102. To predict a potential movement of one of the pedestrians 138, a pedestrian symbol 1110 is displayed in in front of direction arrow 1108. The outline of pedestrian symbol 1110 is a dashed line indicating the pedestrian symbol 1110 is only a predicted movement of one of the pedestrians 138.

The alert symbol 1102 and pedestrian symbol 1110 indicate that computer system 404 has determined there is a probability of one of the pedestrians 138 crossing intersection 102 that could be a road hazard to vehicle 104. By displaying informing alert image 1100 with pedestrian symbol 1110, a driver can be alerted to a potential road hazard if one of the group of pedestrians 138 follows the predicted pattern of travel indicated.

Computer system 404 can also inform other vehicles or entities within the vehicle communications network 200 of the potential collision risks. Computer system 404 can broadcast the potential collision risk data from informing alert image 1100 and alert information using V2V communication protocols. Remote vehicle 110 and motorcycle 130 can receive the V2V messages from vehicle 104 and display the informing alert image 1100 according to each vehicle's perspective and display device.

In the embodiment, computer system 404 can also collect event data regarding a school bus stop. The event can be determined automatically from comparison calculator 404 analyzing the school bus 134 from V2V signals and/or a driver in vehicle 104 can manually enter the school bus stop event into computer system 404 via input device 424. Computer system 404 can determine to add the images, time, location, and V2X data from all events at the intersection 102 to the existing event data for intersection 102 in collision event database 422.

FIG. 12 illustrates an embodiment of the CWS 400 alerting a vehicle of a potential collision scenario with a bicycle. FIG. 12 includes display device 610 displaying informing alert image 1200 generated by collision event map component 416. Informing alert image 1200 displays some features of the intersection 102 from a navigation perspective of vehicle 104. In the embodiment, computer system 404 can include prior and/or historical event data for intersection 102. Vehicle communication network 200 users in proximity to intersection 102 include the remote vehicle 110 that is equipped with the CWS 400 and V2V transceiver 108, the bicycle 120 equipped with V2B transceiver 122, and the motorcycle 130 that is equipped with the CWS 400 and V2M transceiver 132. The bicycle 120 is traveling in bicycle lane 124 in close proximity to vehicle 104.

In the scenario, as vehicle 104 approaches intersection 102, computer system 404 searches and locates historical and/or prior event data for events based on vehicle 104 location, provided by geographic position component 438. The prior event data indicates patterns of unexpected V2B movements across the intersection 102 in the path of vehicle 104. The prior events have a conditional time frame for weekdays between 5:00 pm to 7:00 pm. The computer system 404 detects from an internal clock that the current time is 6:00 pm on a weekday and determines the current event data meets the conditional threshold for the prior events.

Computer system 404 analyzes and translates V2X signals as to source, location, and telemetry, and collision event map component 416 maps the signals onto informing alert image 1200. Using GPS location information from the V2X messages, computer system 404 can direct sensor system 516 to activate camera 522 to collect images of transmitting V2X entities. The images can be transmitted to computer system 404 for image recognition. In some embodiments, informing alert image 1200 can display icons corresponding to a type of V2X signal received, e.g., a motorcycle icon for a V2M signal. In an alternative embodiment, where images of V2X entities have been recognized, actual images of pedestrians, vehicles, motorcycles, etc. can be displayed on informing alert image 1200.

Computer system 404 can detect movement of the V2B transceiver 122 towards the intersection 102. Comparison calculator 420 can analyze the real time data of the V2B movement and determines a statistical match between current event data and historical V2B data patterns that the bicycle 120 has a likelihood of crossing the intersection 102 outside of bicycle lane 124 and in the path of vehicle 104. To inform vehicle 104 of a potential collision event, computer system 404 displays an alert symbol 1206 on display device 610. To predict the nature of the potential collision event, computer system 404 displays movement of bicycle 120 along a trajectory indicated by direction arrow 1202 towards intersection 102. To predict a potential movement of bicycle 120, a bicycle symbol 1204 can be displayed in front of direction arrow 1202. The outline of bicycle symbol 1204 is a dashed line indicating that the bicycle symbol 1204 is only a predicted movement of bicycle 120. The alert symbol 1206 and bicycle symbol 1204 indicate that computer system 404 has determined a likely probability of bicycle 120 crossing intersection 102 that could be a collision risk to vehicle 104. The determination can be based on V2B signals combined with a calculated pattern of bicycles crossing intersection 102 outside of bicycle lane 124 within the current time frame. By displaying informing alert image 1200 with bicycle symbol 1204, a driver can be alerted to a potential road hazard if bicycle 120 follows the predicted pattern of travel indicated.

FIG. 13 illustrates an embodiment of the CWS 400 alerting vehicle 104 of a potential collision scenario with wildlife. In FIG. 13, informing alert image 1300 displays on display device 610 some features of the intersection 102 from a navigation perspective of vehicle 104. In the embodiment, the computer system 404 can include prior and/or historical event data that was collected in proximity to intersection 102. Vehicle communication network 200 users with near intersection 102 include remote vehicle 110 that is equipped with the CWS 400 and V2V transceiver 108, and motorcycle 130 that is equipped with the CWS 400 and V2M transceiver 132.

As vehicle 104 approaches intersection 102, computer system 404 searches and locates prior event data for events based on vehicle 104 location, provided by geographic position component 438. The prior event data indicates patterns of unexpected wildlife movements across the intersection 102 within a time frame of 8:00 pm to 8:00 am. The computer system 404 detects from an internal clock that the current time is 10:00 pm and determines the current event data meets the conditional data patterns. Computer system 404 also detects V2V and V2M signals received through vehicle V2V transceiver 106. Computer system 404 analyzes and translates V2X signals as to source, location, and telemetry, and collision event map component 416 maps the signals onto informing alert image 1300.

Computer system 404 receives from vehicle radar system 520 that indicate movement of an unknown entity 1302 in proximity to vehicle 104. Based on the detected movement, collision event map component 416 maps unknown entity 1302 onto informing alert image 1300. Computer system 404 can direct sensor system 516 to activate camera 522 and attempt to collect images of the unknown entity 1302. Comparison calculator 420 can analyze the current event data of the entity's movement and determine, based on comparisons with image recognition of images from camera 522, and prior event patterns, that the unknown entity 1302 has a statistical likelihood of being wildlife crossing the intersection 102 in the path of vehicle 104.

To inform vehicle 104 of a potential collision event, computer system 404 displays an alert symbol 1308 on display device 610. To predict the nature of the potential collision event, computer system 404 displays movement of entity 1302 along a trajectory indicated by direction arrow 1304 towards intersection 102. To predict a potential movement of unknown entity 1302, a deer symbol 1306 can be displayed in front of direction arrow 1304. The outline of the deer symbol 1306 is a dashed line indicating a predicted path of unknown entity 1302. The alert symbol 1308 and deer symbol 1306 indicate a probability of unknown entity 1302 crossing intersection 102 that can be a road hazard to vehicle 104. The determination is based on radar signals from radar system 520 combined with one or more patterns of wildlife crossing intersection 102 within the conditional time frame. By displaying alert symbol 1308 with deer symbol 1306, a driver of vehicle 104 can be alerted to a potential road hazard if unknown entity 1302 moves in a heading indicated by the predicted pattern of travel.

To warn other V2X users in proximity to intersection 102, computer system 404 can broadcast the potential collision event data and alerts via V2V signals that can be received and displayed by the CWS 400 in remote vehicle 110 and the CWS 400 in motorcycle 130.

In the figures, although a single image is shown for each type of alert, other embodiments can include one or more images for each type of alert. In particular, an arrow used to indicate position and heading of a road hazard or potential collision risk can be changed from a direction arrow to any type of indication of entity, movement, direction, etc. that can help inform a driver of the potential road hazards and/or potential collision events. In the embodiments, multiple images can distinguish between the types of alerts. For example, an alert symbol can be used to distinguish between informing alerts and warning/hazard alerts. Likewise, informing alerts can be associated with a different color or symbol than warning alerts. In other embodiments, alerts can indicate multiple levels of threats of potential road hazards.

Figure 14:
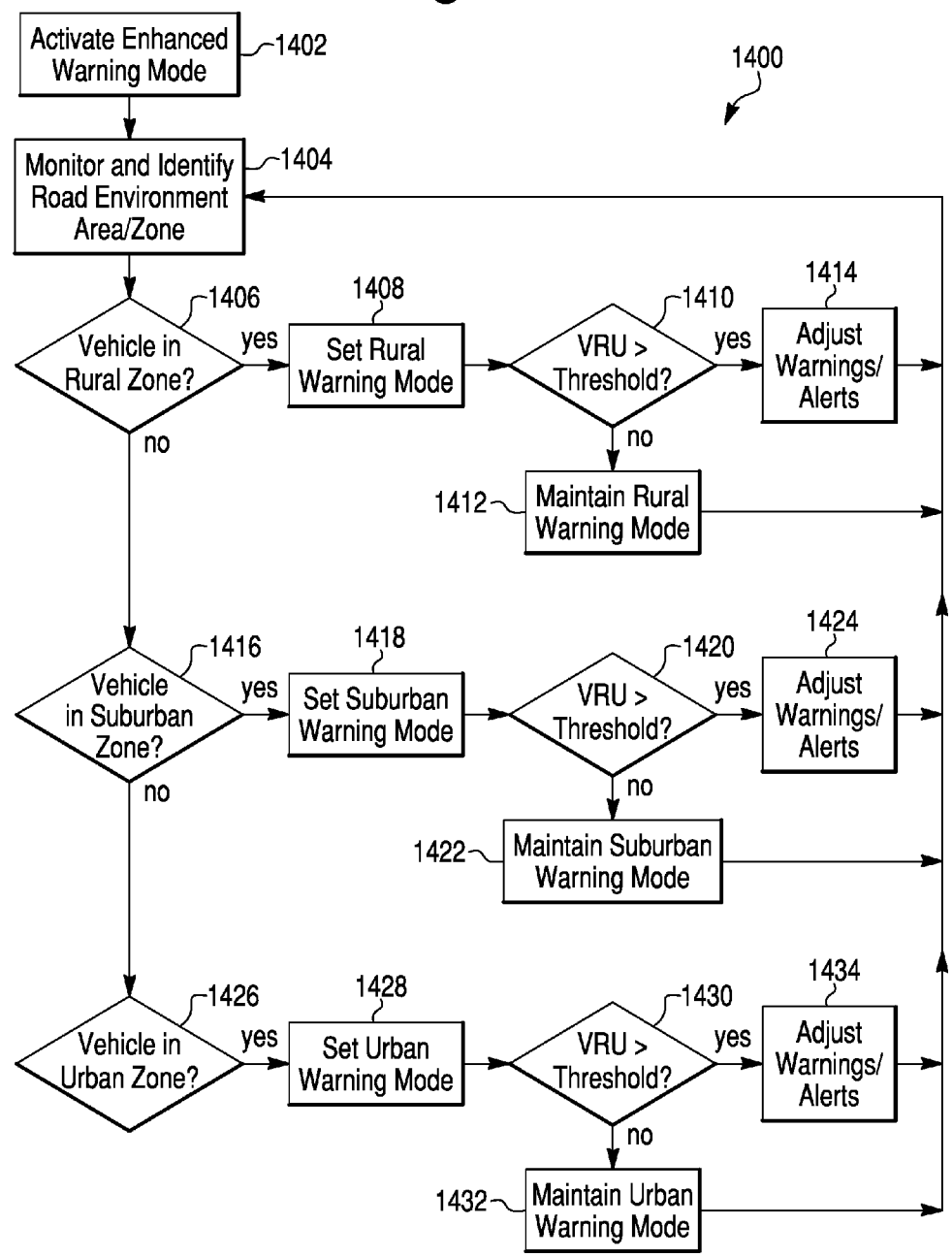
FIG. 14 is a flowchart of a method for configuring the collision warning system of FIG. 4 based on an environment.

FIG. 14 is a flowchart of a method 1400 for configuring the CWS 400 based on an environment. In some cases, a driver can have an opinion that a computer system 404 generates too many alerts, especially in a case of informing alerts about situations already known to a driver. For example, in situations where vehicle 104 is located in an urban environment, such as business district of a city, many pedestrians similar to group of pedestrians 138 may be walking along sidewalks in proximity to vehicle 104. In such a situation, a visual or audible alert of every pedestrian in proximity to vehicle 104 can be deemed a nuisance. It can therefore be beneficial for computer system 404 to adjust the number of alerts generated to vehicle 104 according a specific type of environment.

In the embodiments, computer system 404 can be configured to generate alerts based on different driving environments external to vehicle 104. In the embodiments, a frequency and/or type of alert can be adjusted between at least two different driving environments. In an alternative embodiment, the frequency and/or type of alert can be adjusted between three or more different driving environments. Some of the embodiments are intended to include driving environments that can include a road classification or a mapped boundary, such as a geographic, legal, or demographic boundary. Examples of boundaries include urban, suburban, or rural areas or zones. However, other embodiments for driving environments are intended to include or otherwise cover alert adjustments based on boundaries for a city, a county, a state or province, or a country, areas defined by population, areas near attractions, demographic areas, or any type of area or boundary. Alerts can be adjusted for any type of environment or classification appropriate for the functionality of the embodiments to distinguish between the driving environments.

The first step for configuring the CWS 400 based on an environment is to activate an enhanced warning mode at step 1402. In the embodiment, a first environment mode can be selected when a configuration is a default mode of operation. A second, or enhanced, environment mode of computer system 404 can perform automatic adjustments of alerts based on a driving environment. In second step 1404, the computer system 404 can monitor and identify a current environment of vehicle 104. It can be beneficial for computer system 404 to interact with vehicle navigation system 436 to identify different road environments and vehicle locations. In an embodiment, environments can be determined using functional road classification data. Functional classification is a method used by state and federal transportation agencies to group highways, roads, and streets by the character of service they provide. Some agencies can classify roads and highways according to urban and rural services based on specific criteria. Some agencies may use other classifications, such as local, major and minor collector, minor arterial, and principal arterial. In step 1404, to monitor and identify the current environment, GPS receiver 510 can determine a current location of vehicle 104, and navigation system 508 can provide computer system 404 the data resources to determine if the current road has a functional classification. Although functional classification of roads is described, the embodiments intend to include or otherwise cover any type of region, area, zone, or road classification system that can accomplish the features and functions of the embodiments. For example, instead of a functional classification system, the method step 1404, to monitor and identify the current environment, can use city, county, state, province, or other boundaries as environmental zones. In an alternative embodiment, environment classification can use terrain, natural land features, natural water features, etc.

FIG. 14 can include step 1406 to determine if vehicle 104 is located in a rural zone. If the vehicle 104 is located in a rural zone, then the method continues to step 1408 where computer system 404 can be configured to a rural warning mode. In the rural warning mode, a predetermined threshold number of pedestrians detected from V2P signals can be automatically configured by computer system 404. The threshold may be configured to any number of pedestrians that could indicate high pedestrian traffic such that frequent V2P warnings to a driver can be deemed a nuisance in a rural environment.

The method proceeds in step 1410 to determine if the number of detected V2P signals representing pedestrians as VRUs exceed the rural warning mode threshold either simultaneously or over a predefined time period. In the case of falling below the threshold, the computer system 404 can remain in a default rural warning mode 1412. In the case of exceeding the threshold, in step 1414 computer system 404 can automatically adjust a frequency and/or type of V2P alerts. In an embodiment, V2P alerts can be generated less frequently than in a default rural configuration. In an alternative embodiment, alerts are changed to an "information" alert that displays V2P information to a display device 610.

The vehicle 104 may be traveling on a road and/or path that will transition from the current environment zone to a new environment zone. Therefore, the method automatically returns to step 1404 to monitor and identify the current environment.

If computer system 404 determines at step 1406, to determine if vehicle is located in a rural zone, that vehicle 104 is not located in a rural zone, the method continues to step 1416 to determine if the vehicle 104 is in a suburban zone. If computer system 404 determines that vehicle 104 is located in a suburban zone, then the method continues to step 1418 where computer system 404 can be configured to a suburban warning mode. In the suburban warning mode, a predetermined threshold number of detected V2P signals can be automatically configured by the computer system 404. The threshold may be configured to any number of pedestrians that can indicate high pedestrian traffic such that frequent V2P alerts can be a nuisance to a driver.

In the embodiment, a number of pedestrians are identified by computer system 404 by their V2P signals within proximity to vehicle 104. The method determines in decision step 1420 if the number of V2P signals exceed the suburban warning mode threshold. If the numbers of pedestrians are below the threshold, the computer system 404 maintains the suburban warning mode at step 1422. If the number of V2P signals exceed the threshold, then step 1424 can automatically adjust a frequency and/or type of warning indicator/alert to a driver either at display device 610 or with an audible indicator. In an embodiment, computer system 404 can generate pedestrian warnings less frequently than in a default suburban configuration. In an alternative embodiment, computer system 404 changes warnings to an "information" mode of configuration that transmits information to a driver instead of a warning or alert. The method automatically returns to step 1404 to monitor and identify the current environment.

At step 1404, to monitor and identify the current environment, if computer system 404 determines that vehicle 104 is not in a rural environment zone or a suburban environment zone, the method continues to 1426 to determine if the vehicle 104 is located within an urban zone. If computer system 404 determines that vehicle 104 is located within an urban zone, then the computer system 404 can be configured to an urban warning mode in step 1428. In the urban warning mode, a predetermined threshold number of V2P signals can be automatically configured by the computer system 404. The threshold may be configured to any number of V2P signals that could indicate high pedestrian traffic such that frequent V2P alerts can be deemed a nuisance.

In decision step 1430, the computer system 404 determines if the number of V2P signals exceed the urban warning mode threshold. In the case of the number of V2P signals falling below the threshold, step 1432 may maintain the urban warning mode. In the case of exceeding the threshold, step 1434 may automatically adjust computer system 404 to configure the frequency and/or type of warning indicator/alert to a driver. In an embodiment, computer system 404 can adjust the alerts to less frequent or not at all. Further, the computer system 404 can generate an "information" mode of configuration that displays V2P information on display device 610 instead of an alert. As a final step, the method automatically returns to step 1404 to monitor and identify the environment.

FIG. 15 is a flowchart of a method 1500 to update event data at the CWS 400 by service provider 212. At predetermined times, the event data in the CWS 400 may be updated, or new event data may be downloaded due to a new subscription or new features to an old subscription for a service associated with CWS 400. The downloaded collision event data may be provided by service provider 212 or another service provider. In some embodiments, the download may occur upon the request from vehicle 104. In other embodiments, the download may occur upon request of the service provider 212. In still other embodiments, vehicle 104 may be programmed to request, or service provider 212 may be programmed to initiate, an automatic download on a predetermined basis.

The method 1500 to update event data may include a first step 1502 where the vehicle 104 CWS 400 initiates a download of updated event data from service provider 212. Computer system 404 may initiate the download of event data by transmitting a request to FCW server 302. A second step 1504 may include the service provider 212 receives the request for the updated event data. A third step 1506 may include the vehicle 104 sending user or vehicle credentials to the service provider 212 in order to identify CWS 400. A fourth step 1508 may include the service provider packaging the next event update. A fifth step 1510 may include the service provider sending the event data update to computer system 404. A sixth step 1512 may include the CWS 400 receiving and updating the CWS 400 with the received event data.

FIG. 16 is a flowchart of an exemplary method 1600 for transmitting event data to the service provider 212. A first step 1602 may include the CWS 400 storing event data in the collision event database 422. A second step 1604 may include the CWS 400 transmitting the event data to the service provider 212. A third step 1606 may include the service provider 212 updating the FCW database 306 with the new event data. A fourth step 1608 may include the service provider 212 providing the updated FCW database 306 to other vehicles using the vehicle communication network 200.

The above described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

VII. Alternative Embodiments

While certain embodiments of the invention are described above, and FIGS. 1-16 disclose the best mode for practicing the various inventive aspects, it should be understood that the invention can be embodied and configured in many different ways without departing from the spirit and scope of the invention.

Exemplary embodiments are intended to include or otherwise cover any type of vehicle-to-vehicle, vehicle-to-external, or one-to-many communication network. In other words, exemplary embodiments are intended to cover any application of a communications network between vehicles, bicycles, motorcycles, pedestrians, processors, servers, controllers, etc. and infrastructure disclosed above.

Exemplary embodiments are intended to include or otherwise cover identification and warning for any type of event or scenario that could be a hazard to a moving vehicle 104 either on a road or off-road. Weather patterns and forces of nature can be identified and saved as potential collision events, such as flooding roads or areas, snowy or icy roads or areas, storm-hit or windy roads or areas, including road hazards, such as fallen rocks or trees caused by forces of nature.

Exemplary embodiments are also intended to cover execution of method steps on any appropriate specialized or general purpose server, computer device, or processor in any order relative to one another. Some of the steps in the embodiments can be omitted, as desired.

A computer architecture of the embodiments may be a general purpose computer or a special purpose computer. A computer can be used to implement any components of the CWS 400 or the methods of the embodiments. For example, components of computer system 404 can be implemented on a computer via its hardware, software program, firmware, or a combination thereof. Although individual computers or servers are shown in the embodiments, the computer functions relating to computer system 404 may be implemented in a distributed fashion on a number of similar platforms, to distribute the processing and/or functional load.

Embodiments are also intended to include or otherwise cover methods of using and methods of manufacturing the collision warning system disclosed above. The methods of manufacturing include or otherwise cover processors and computer programs implemented by processors used to design various elements of the CWS 400 above. For example, embodiments are intended to cover processors and computer programs used to design or test the CWS 400.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A vehicular communications network for use with a vehicle that is configured for operation by a vehicle operator and for travel along a path, at least one source of historical path data relevant to historical conditions of the path, at least one source of current path data relevant to current conditions of the path, and at least one source of vehicle location data relevant to the vehicle's location on the path, the vehicular communications network comprising:

a processor that is configured to:
    access the historical path data, the current path data, and the vehicle location data,
    determine the vehicle's current location based on the vehicle location data,
    determine an event pattern relevant to the determined vehicle current location based on the historical path data, wherein the event pattern indicates patterns of prior entity movement relevant to the determined vehicle current location and
    predict an anticipated path condition based on the determined event pattern and the current path data, wherein the anticipated path condition is a potential for movement of an entity in proximity to the path and the current path data includes current conditions of the path indicating disposition of the entity in proximity to the path; and a driver vehicle interface that is configured to communicate the anticipated path condition to the vehicle operator.

2. The vehicular communications network of claim 1, wherein the event pattern indicates patterns of one or more entities moving onto the path.

3. The vehicular communications network of claim 2, wherein the processor determines the event pattern by analysis of the historical path data according to a data characteristic, wherein the data characteristic is a temporal component, including at least one of time of day, day of the week, and date.

4. The vehicular communications network of claim 1, wherein the at least one source of current path data includes a sensor disposed at the vehicle that is configured to sense whether the entity is disposed in proximity to the path.

5. The vehicular communications network of claim 4, wherein the sensor includes at least one of at least one of an optical camera, radar system, and laser.

6. The vehicular communications network of claim 1, wherein the processor is configured to access at least one of the historical path data and the current path data wirelessly via a service provider.

7. The vehicular communications network of claim 6, wherein the service provider includes a server, electronic storage medium, transmitter, and receiver.

8. The vehicular communications network of claim 1, wherein the processor predicts the anticipated path condition based on the determined event pattern and the current path data by using weighting models that weigh probabilities associated with the determined event pattern.

9. The vehicular communications network of claim 1, wherein the driver vehicle interface includes at least one of a display and an annunciator disposed at an interior of the vehicle.

10. A vehicular communications network for use with a vehicle that is configured for operation by a vehicle operator and for travel along a path, at least one source of historical path data relevant to historical conditions of the path, and at least one source of vehicle location data relevant to the vehicle's location on the path, the vehicular communications network comprising:

at least one sensor that is configured to sense current path data relevant to current conditions of the path, wherein the current path data includes entity movement of an entity relevant to the path;

an electronic storage medium that is configured to store at least one of the historical path data, the current path data, and the vehicle location data;

a processor that is configured to:
communicate with the electronic storage medium to access at least one of the historical path data, the current path data, and the vehicle location data,
determine the vehicle's current location based on the vehicle location data,
determine an event pattern of prior entity movement relevant to the determined vehicle current location based on the historical path data, and
predict an anticipated path condition based on the determined event pattern and the current path data, wherein the anticipated path condition indicates a potential of the entity to move onto the path; and a driver vehicle interface that is configured to communicate the anticipated path condition to the vehicle operator.

11. The vehicular communications network of claim 10, wherein the event pattern of prior entity movement is based on historical path data relating to patterns of entities moving onto the vehicle's path.

12. The vehicular communications network of claim 11, wherein the processor determines the event pattern of prior entity movement based on a temporal component, including at least one of time of day, day of the week, and date.

13. The vehicular communications network of claim 10, wherein the at least one sensor is disposed at the vehicle and configured to sense the entity movement of the entity relevant to the path.

14. The vehicular communications network of claim 13, wherein the at least one sensor includes at least one of at least one of an optical camera, radar system, and laser.

15. The vehicular communications network of claim 10, wherein the processor is configured to access at least one of the historical path data and the current path data wirelessly via a service provider that includes a server, electronic storage medium, transmitter, and receiver.

16. The vehicular communications network of claim 10, wherein the processor predicts the anticipated path condition based on the determined event pattern and the current path data by using weighting models that weigh probabilities associated with the determined event pattern.

17. The vehicular communications network of claim 10, wherein the driver vehicle interface includes at least one of a display and an annunciator disposed at an interior of the vehicle.

18. A method of assessing vehicular conditions and communicating the assessed conditions using a vehicular communications network to an operator of a vehicle, wherein the vehicle is operably connected to the vehicular communications network and is configured for travel along a path, the method being implemented by a processor and comprising:

accessing historical path data relevant to historical conditions of the path, current path data relevant to current conditions of the path, and vehicle location data relevant to the vehicle's location on the path;

determining the vehicle's current location based on the vehicle location data;

determining an event pattern indicating patterns of entity movement relevant to the determined vehicle current location based on the historical path data;

predicting an anticipated path condition indicating a potential of movement of an entity in proximity to the determined vehicle current location based on the determined event pattern and the current path data, wherein the current path data includes real time data of the movement of the entity in proximity to the determined vehicle current location; and communicating the anticipated path condition to the vehicle using the vehicular communications network.

19. The vehicular communications network of claim 1, wherein the entity is equipped with a sensor that can sense movement of the entity, and the sensor is the at least one source of current path data.

20. The vehicular communications network of claim 6, wherein the processor is configured to classify the current path data as new event data according to the determined event pattern and transmit the new event data to the service provider thereby updating the historical path data to include the new event data with the determined event pattern.

* * * * *